United States Patent
McKernan et al.

(10) Patent No.: US 9,935,469 B2
(45) Date of Patent: *Apr. 3, 2018

(54) WIRELESS POWER TRANSFER AND COMMUNICATIONS FOR INDUSTRIAL EQUIPMENT

(71) Applicant: Cascade Corporation, Fairview, OR (US)

(72) Inventors: Pat S. McKernan, Portland, OR (US); Gregory A. Nagle, Portland, OR (US)

(73) Assignee: Cascade Corporation, Fairview, OR (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/618,784

(22) Filed: Feb. 10, 2015

(65) Prior Publication Data

US 2016/0233687 A1 Aug. 11, 2016

(51) Int. Cl.
| | |
|---|---|
| H02J 5/00 | (2016.01) |
| B66F 9/24 | (2006.01) |
| H02J 7/00 | (2006.01) |
| H04B 5/00 | (2006.01) |
| H02J 7/02 | (2016.01) |
| H02J 50/10 | (2016.01) |
| H02J 50/90 | (2016.01) |
| H02J 50/80 | (2016.01) |
| B66F 9/18 | (2006.01) |
| B66F 9/20 | (2006.01) |
| B66F 9/22 | (2006.01) |

(52) U.S. Cl.
CPC .............. *H02J 5/005* (2013.01); *B66F 9/183* (2013.01); *B66F 9/184* (2013.01); *B66F 9/205* (2013.01); *B66F 9/22* (2013.01); *B66F 9/24* (2013.01); *H02J 7/0068* (2013.01); *H02J 7/025* (2013.01); *H02J 50/10* (2016.02); *H02J 50/80* (2016.02); *H02J 50/90* (2016.02); *H04B 5/0037* (2013.01); *H04B 5/0031* (2013.01); *H04B 5/0075* (2013.01)

(58) Field of Classification Search
CPC ... B66F 9/24; H02J 5/005; H02J 50/10; H02J 7/0044; H02J 7/0068; H02J 7/025; H04B 5/0037
USPC ........................................................ 307/104
See application file for complete search history.

(56) References Cited

U.S. PATENT DOCUMENTS

| | | | |
|---|---|---|---|
| 6,439,826 | B1 | 8/2002 | Jordan et al. |
| 8,078,315 | B2 | 12/2011 | McKernan et al. |
| 8,403,618 | B2 | 3/2013 | Prentice et al. |
| 2009/0096413 | A1 | 4/2009 | Partovi et al. |
| 2012/0007441 | A1 | 1/2012 | John |
| 2012/0145485 | A1 | 6/2012 | McCabe et al. |
| 2012/0242283 | A1* | 9/2012 | Kim ............... H02J 5/005 320/108 |

(Continued)

OTHER PUBLICATIONS

Blaine C. Copenheaver, International Search Report issued in application PCT/US2015/058476, dated Jan. 19, 2016, 2 pgs, US Patent Office, ISA/US, Alexandria, VA.

(Continued)

*Primary Examiner* — Rexford Barnie
*Assistant Examiner* — Elim Ortiz
(74) *Attorney, Agent, or Firm* — Chernoff, Vilhauer, McClung & Stenzel, LLP

(57) ABSTRACT

Methods and systems for wirelessly transmitting power and/or data.

16 Claims, 15 Drawing Sheets

(56) References Cited

U.S. PATENT DOCUMENTS

2012/0248886 A1 10/2012 Kesler et al.
2013/0043734 A1* 2/2013 Stone .................. H04B 5/0037
307/104

OTHER PUBLICATIONS

Blaine C. Copenheaver, Written Opinion of the International Searching Authority issued in application PCT/US2015/058476, dated Jan. 19, 2016, 5 pgs, US Patent Office, ISA/US, Alexandria, VA.

* cited by examiner

WIRELESS POWER TRANSFER AND COMMUNICATIONS FOR INDUSTRIAL EQUIPMENT

CROSS-REFERENCE TO RELATED APPLICATIONS

Not applicable.

BACKGROUND

The present disclosure relates to industrial equipment comprising different units selectively attachable to each other to jointly perform a desired activity. More specifically, the present disclosure relates to industrial equipment where communications signals and/or power must be transferred between such different units in order to perform the activity desired.

One example of such equipment is a lift truck carriage that is selectively attachable to a load handler to lift and move cargo, such as crates, paper rolls, etc. from one place to another. Typically, the load handler will include load-engaging members such as forks that raise pallets, clamps that grasp paper rolls, etc. where positioning of the load-engaging members as well as movement of the load is accomplished hydraulically using fluid supplied from a reservoir on the lift truck. Movement of pressurized fluid between the lift truck and the load handler typically occurs in hydraulic lines that extend over a mast of the lift truck to the load handler.

Many types of load handlers have multiple, separately-controllable fluid power functions. Most of these functions require bidirectional, reversible actuation. Examples of such load handlers include side-shifting fork positioners, side-shifting push-pull attachments, side-shifting and/or rotational load clamps having either parallel sliding clamp arms or pivoting clamp arms, and other types of fluid power-actuated multi-function load handlers. Normally, the foregoing types of load handlers are mounted on a load carriage that is selectively raised and lowered on a mast of an industrial lift truck. Multiple fluid control valves in the lift truck operator's compartment may separately regulate each of the multiple fluid power functions of the load handler. In such cases, four or even six hydraulic lines must communicate between the lift truck and the load handler to operate the multiple bidirectional functions. To avoid the necessity for more than two hydraulic lines extending over the mast of the lift truck, it has long been common to provide only a single control valve in the operator's compartment connected to a pair of hydraulic lines extending between the lift truck and a multi-function load handler.

FIGS. 1 and 2, for example, show a lift truck 10 attached to a roll clamp 12 used to clamp and unclamp cylindrical objects such as large paper rolls, using rotatable pivoted arm clamps 14 actuated by hydraulic cylinders 16 and 17. Though FIG. 1 shows only one cylinder 16 and one cylinder 17, the roll clamp 12 may include two cylinders 16 and two cylinders 17, where the cylinders not shown are located behind the cylinders 16 and 17 that are shown. Rotation of the clamps 14 is achieved by a rotator 18, which rotates the clamp bi-directionally about a longitudinal axis in response to a bidirectional hydraulic motor 20. While the roll clamp 12 includes separate cylinders 16 and 17 by which the clamp arms 14 may be independently actuated, some roll clamps have only a single pair of cylinders 16 to actuate one of the clamp arms 14, while the clamp arm 14 not actuated by the cylinders 16 is fixed.

As seen in FIG. 2, hydraulic fluid from a reservoir 24 is exchanged between the lift truck 10 and the roll clamp 12 via two hydraulic lines 26 and 27 that extend over the mast 22 of the lift truck 10. A handle 28 on the lift truck 10 permits an operator to alternately open or close the clamp arms 14 via actuation of the cylinders 16 and 17, and also permits an operator to rotate the clamps 14 in either selected one of a clockwise or counter clockwise direction via a rotator motor 30. A switch 32 located on the handle 28 is used to determine which function (rotation or clamping) is controlled by the handle 28. The switch 32 is integrated into a wireless transmitter 34 that is in communication with a wireless receiver 36 having a corresponding switch 38 in the roll clamp 12. Thus, for example, an operator can wirelessly cause the switch 38 to operate a spring-biased solenoid valve 40 between an open position and a closed position. It should be understood by those of skill in the art that many other operations may be hydraulically enabled, besides opening and closing a clamp, such as raising or lowering a carriage, side-shifting or rolling a carriage, among many other functions common to lift trucks.

In the open position (as depicted in FIG. 2), pressurized fluid is directed from the reservoir 24 in the lift truck 10, through lines 26, 27 and over the mast 22 to operate the rotator motor 30 in either of two rotational directions depending on the position of the handle 28, i.e. by determining the direction of the flow through the lines 26, 27. Conversely, when the operator uses the switch 32 to wirelessly activate the solenoid valve 40, fluid from the reservoir 24 flows through a pilot line 42 to cause selector control valve 44 to redirect fluid from the rotator motor 30 to the clamp cylinders 16 and 17, as shown in FIG. 2. In this configuration, operation of the handle 28 will alternatively extend or retract the cylinders 16 depending on the position of the handle 28, i.e. by determining the direction of the flow through the lines 26, 27. If a third hydraulic function, such as laterally extending the roll clamp frame were also included, a second pilot-operated valve assembly similar to the combination of valves 40 and 44 would be provided for lateral control using an assembly similar to piston and cylinder assemblies 17, together with a second transmitter/receiver set such as 34 and 36, and a second operator-controlled electrical switch 32.

Hydraulically actuated solenoid switches located on remote attachments, such as the valves 40 and 44 shown in FIG. 2, require a non-trivial amount of power to operate—typically more power than can feasibly be transferred by a wireless radio signal. In such cases, one or more solenoid valves are mounted on the load handler and are controlled by electrical wires routed between the lift truck and the load handler, over the mast of the lift truck, so that the operator can electrically select which load handler function will be actuated by the single pair of hydraulic lines. The masts, however, often include rigid metal frames that are slideably engaged with each other to provide a telescoping extension for the mast. Designing a mast having these electrical wires is a complicated task, as there may be bearings between the moving frames and the wires, and the wires must be placed proximate the sliding metal frames without interfering with movement of the mast. Even with the most careful design, routing the electrical wires over the lift truck mast to a movable load handler requires exposure of the wires and their connectors to significant hazards, wear, and deterioration, which results in breakage, short-circuiting, corrosion and other problems that require relatively frequent replacement and downtime. Moreover, lift truck electrical systems range from twelve to ninety volts, requiring a variety of special coils for the solenoid valves.

To eliminate the need for electrical wires that extend over the mast of a lift truck, some load handlers are equipped with a power supply such as a battery to operate the solenoid valves, or other devices that require power, on the load handler. Batteries on attachments, though, deplete rather quickly necessitating replacement and/or frequent charging. This can become quite burdensome and/or inefficient, particularly in energy intensive applications that include multiple batteries on each attachment, where each battery requires weekly replacement or downtime for recharging.

Moreover, when electrical power to hydraulic solenoid valves or other electronic devices is provided by a power supply on the attachment, but controlled by an operator on a lift truck, some means must be used to provide control signals to the attachment-side electrical system to operate the attachment's electrical equipment. Typically, this is performed using wireless communication channels between transmitters on the lift truck and receivers on the attachment, as shown for example in U.S. Pat. Nos. 3,647,255, 3,768, 367, 3,892,079, 4,381,872, 4,526,413, and 6,662,881. Though eliminating the need for electrical wires over the mast of a lift truck, wireless transmitters may often clutter the lift trucks, particularly when those lift trucks are to be serially attached to several different types of attachments that have different respective types of electrical components, e.g. solenoid switches, sensor arrays, bar code readers, lasers, etc.

What is desired, therefore, is improved systems and methods for operating electrical and/or electromechanical equipment on remote attachments, such as lift truck load handlers.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

As noted above, designing a control system for the operation of electromechanical equipment on an attachment to an industrial vehicle is challenging, and often involves balancing competing considerations, such as eliminating wired electrical connections over a mast, which tend to degrade over time, by using a battery on the attachment which unfortunately necessitates frequent recharging and/or replacement. Moreover, using a battery mounted to the attachment requires the use of wireless control signals to be communicated between the lift truck and the attachment, which as noted previously tends to clutter the lift truck with transmitters given the large number of types of control signals that the lift truck will need to communicate as many different types of attachments, each with their own unique set of functions, are attached to the lift truck over time. This may become problematical as the lift truck may not have a great deal of space for too many transmitters, particularly given that the lift truck needs to move between and around many obstacles in an industrial environment, and positioning a number of transmitters on the outside of a lift truck increases the probability of damage to the transmitters due to collisions with other objects.

Figure 1:
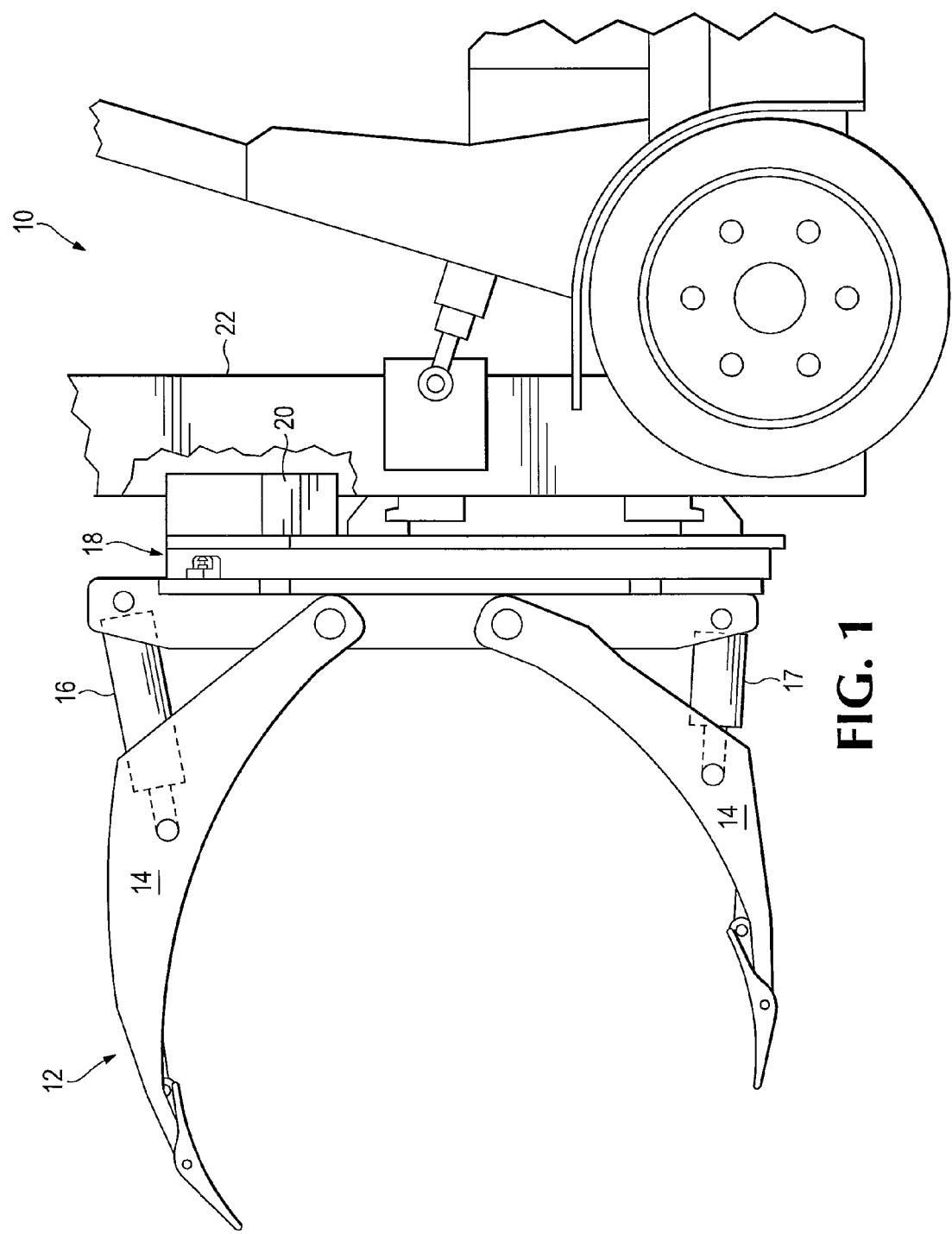
FIG. 1 shows an industrial lift truck attached to a roll clamp.
Figure 2:
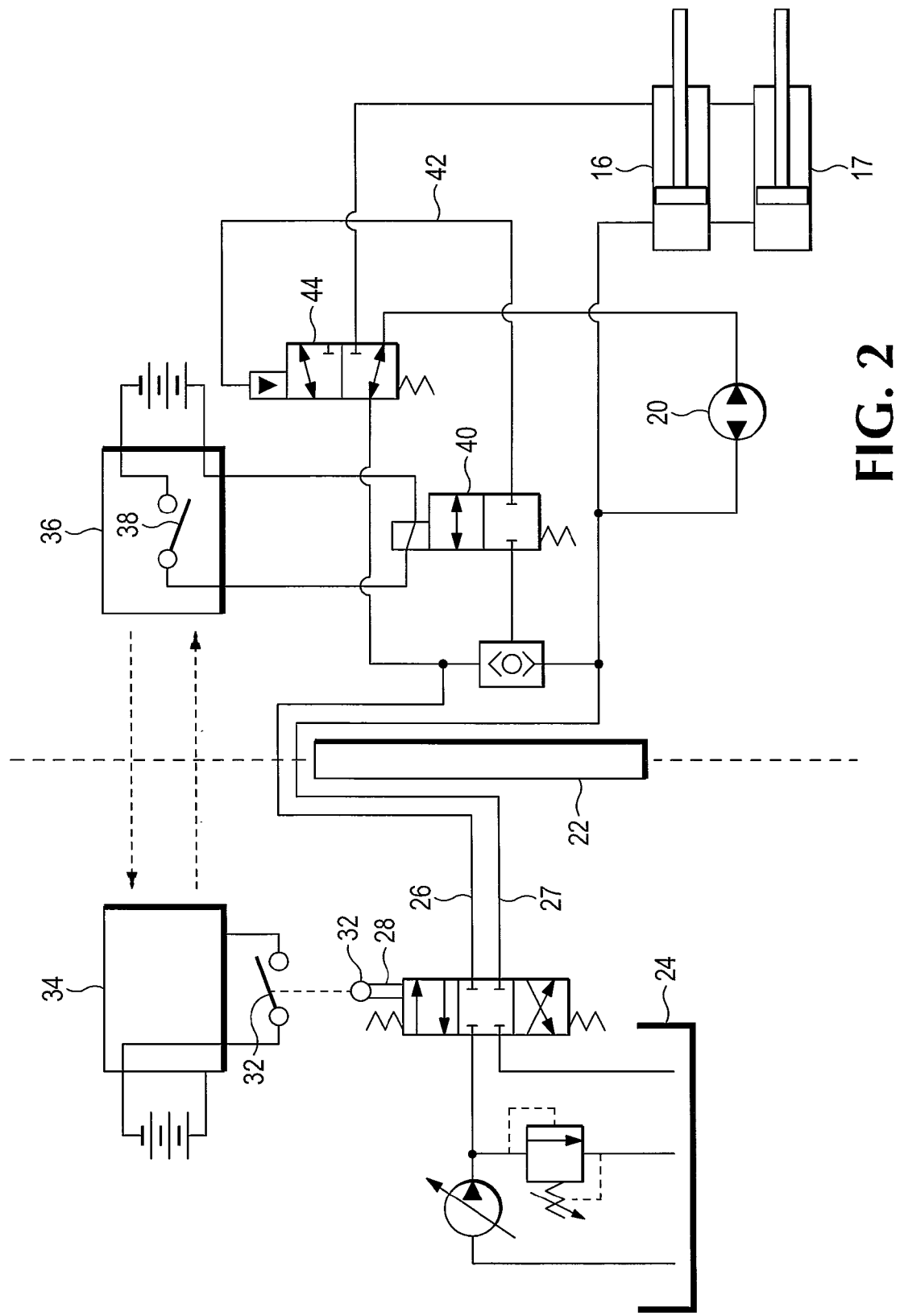
FIG. 2 shows electrical and hydraulic circuitry for operating the roll clamp of FIG. 1.
Figure 3:
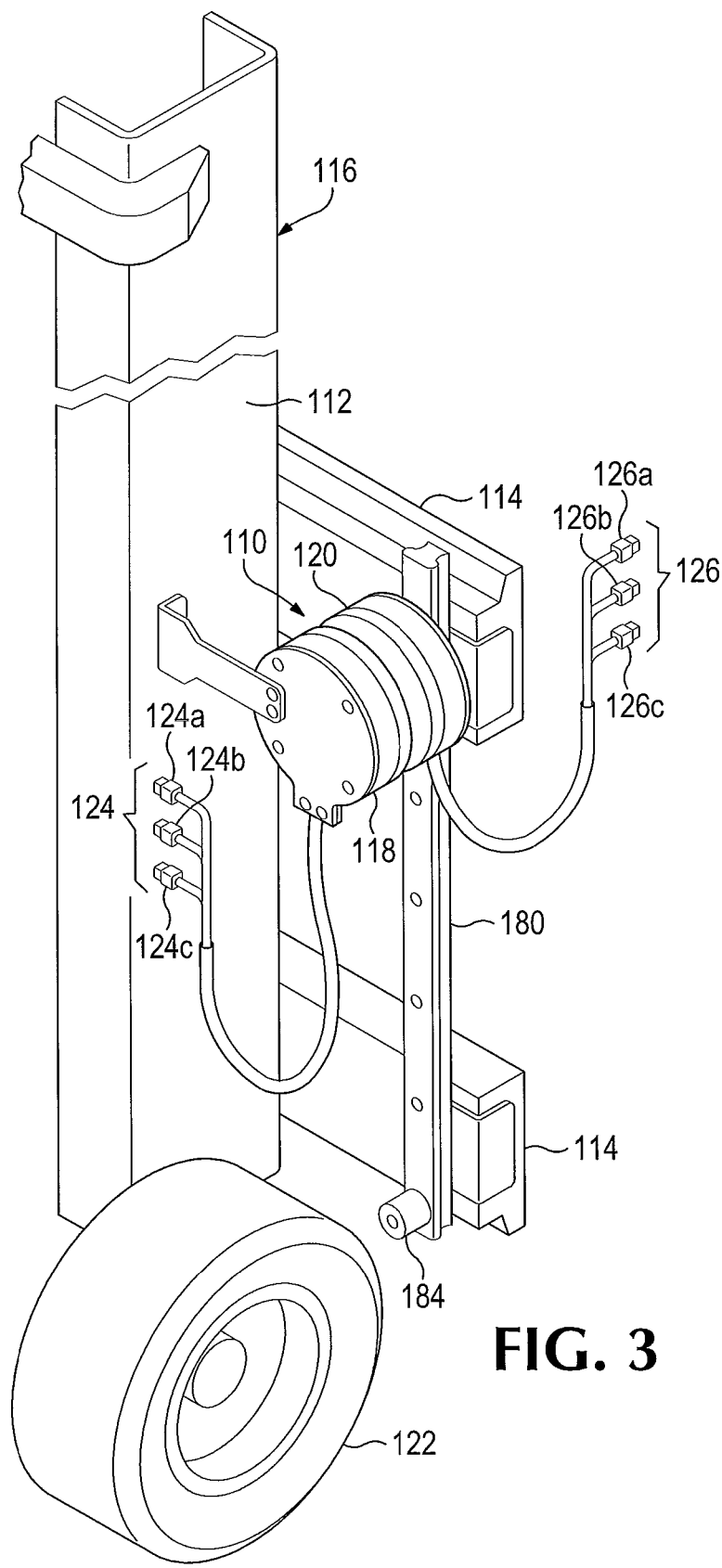
FIG. 3 shows a portion of a lift truck having mounted to it a wireless power and communication (WPC) transmitter and receiver, together capable of wirelessly communicating power and/or data signals between them.

Referring to FIG. 3, a novel multifunction wireless power and communication (WPC) unit 110 is capable of wirelessly transmitting power between a host vehicle 112 and an attachment (not shown) mounted to a carriage 114 that is vertically slidable along the mast 116 of the host vehicle. The host vehicle could be an industrial lift truck, for example, or might alternatively be a construction vehicle or any other type of moveable industrial equipment to which an attachment may be selectively attached and detached. Though the disclosed features of the WPC unit 110 will be illustrated throughout this specification by reference to interactions between an industrial lift truck and a lift truck attachment, it will be appreciated by those skilled in the art that the WPC unit 110 is readily adapted for use in many other applications, such as construction, materials handling, robotics, etc. It should also be understood that, although FIG. 3 shows the WPC power transmitter 118 and the WPC receiver 120 mounted to the host vehicle 112, other embodiments may selectively mount the WPC power transmitter to the host vehicle 112 while the WPC power receiver 120 is mounted to the attachment, where appropriate for the application and/or design.

A first function of the WPC unit 110 is to wirelessly transfer power from a power source on the host vehicle 112 to an attachment moveably mounted to the host vehicle 112 via a carriage 114 or other structural member of the host vehicle 112. The WPC unit 110, for example, may include a WPC power transmitter 118 mounted rigidly to the host vehicle 112 and capable of inductively transferring power to a WPC power receiver 120 mounted to the carriage 114 of the host vehicle. The term "inductive transfer" of power refers to power transmitted by induction between two objects not in contact with each other. Preferably, the power received by the WPC power receiver 120 may be used to directly power electromechanical functions on the attachment. In other embodiments, the power received by the WPC power receiver 120 may be used to directly power electromechanical functions on the attachment and to recharge a battery on the attachment, so that the battery may be used to also power electromechanical functions on the attachment during time intervals when the power received from the WPC power transmitter 118 is insufficient to fully operate the attachment. For example, as can be seen from in FIG. 3, the WPC power transmitter 118 and the WPC power receiver 120 may not always be aligned for inductive power transfer as the carriage 114 slides vertically relative to the host vehicle. In other implementations using other host vehicles and/or attachments, the WPC power transmitter 118 and WPC power receiver 120 may lose alignment due to rotating faceplates, load transfer surfaces, or horizontal moving faces such as in a load Push-Pull attachment.

In these latter embodiments, the battery may in some instances be used to augment or replace power received by the WPC power receiver 120 when necessary to operate electromechanical or electrical devices on the attachment. In other instances, the WPC unit 110 may be used to recharge the battery on the attachment, which in turn may power all electrical and electromechanical devices on the attachment. In some embodiments, a power management controller located either within the WPC power receiver 120 or some other location provides for seamlessly switching the power supply to attachment devices from being supplied (1) only from the WPC power transmitter 118; (2) only from the battery on the attachment; and (3) from the WPC power transmitter 118 and the battery on the attachment, as well as to use power from the WPC power transmitter 118 to recharge the battery on the attachment when full power from the WPC power transmitter 118 is not needed to directly power devices on the attachment.

A second function of the WPC unit 110 is to transmit RF Input/Output (RF I/O) signals between the host vehicle 112 and the attachment. The RF I/O communication channels permit non-contact two-way signaling and/or power switching between the host vehicle 112 and the attachment, and thus can be used not only to signal or cause a change in state of a sensor or switch but as an output, can also preferably be used to directly provide power to a responding device such as a solenoid, relay, light, horn, or other device. Preferably, the RF I/O channels are provided within the electronic circuitry of the WPC unit 110. As one example, the WPC power transmitter 118 may communicate switching control signals to the attachment via the WPC power receiver 120, which in turn communicates those signals to power respective solenoid switches/valves on the attachment. As another example, the WPC power receiver 120 may communicate RF I/O signals from the attachment to the WPC power transmitter 118, which in turn relays those signals to the host vehicle 112. Such signals from an attachment back to the host vehicle may be useful, for example, to warn an operator when an operation is completed or the attachment is in the correct position by turning on an indicator or powering a solenoid for function control. The WPC unit 110 may provide for any desired number of RF I/O channels, in each direction, between the host vehicle 110 and the attachment. In a preferred embodiment, the WPC unit includes two dedicated RF input channels and two dedicated RF output channels between the WPC power transmitter 118 and the WPC power receiver 120. It should be understood that each of the numbers of channels, in each direction, may be changed as desired to suit the application.

A third function of the WPC unit 110 is to transmit CAN bus (for controller area network) communications between the host vehicle 112 and the attachment. The CAN bus standard is a two-way message-based protocol designed to allow microcontrollers and devices to communicate with each other within a vehicle without a host computer. CAN bus communications between the host vehicle 112 and the attachment may be used, for example, to transmit bar codes, sensor data, etc. from the attachment back to the host vehicle 112. As another example, the WPC power receiver 120 may communicate analog signals from the attachment to the WPC power transmitter 118, which in turn relays those signals to the host vehicle 112 or vehicle mounted controller. Such RF signals from an attachment back to the host vehicle may be useful, for example, when an appropriate hydraulic line pressure or hydraulic flow rate, based upon sensor readings, is taken on the attachment side.

Preferably, the CAN bus communication channel has a continuous transmission range between the WPC power transmitter and the WPC power receiver of not less than thirty feet. The CAN bus communication channel preferably permits selective transmission of user-specified addresses or a range of addresses to optimize performance. Those of ordinary skill in the art will appreciate that the WPC unit 110 may use other network protocols instead of, or in addition to, CAN communications. For example, depending on the complexity of the applications to be controlled by the WPC unit 110, network protocols such as Bluetooth, Ethernet protocols, HTTP, SMS, etc. may be used.

To facilitate conveyance of the power signals, RF I/O signals, and the CAN bus signals between the host vehicle 110 and the attachment, each of the WPC power transmitter 118 and the WPC power receiver 120 includes connectors 124 and 126, respectively. For example, the WPC power transmitter 118 preferably includes a power connector 124*a* connectable to a power supply on the host vehicle 112, an RF I/O connector 124*b*, and a CAN bus connector 124*c*. Similarly, the WPC power receiver 120 preferably includes a power connector 126*a* connectable to a battery on the attachment, an RF I/O connector 126*b*, and a CAN bus connector 126*c*. Each of these connections will be discussed later in this specification.

Each of the WPC power transmitter 118 and the WPC power receiver 120 preferably has a form factor designed to shelter each within protective areas of the host vehicle 110 and/or attachment. For example, as seen in FIG. 3, the WPC unit 110 may be conveniently positioned above a front wheel 122 of the host vehicle 112, and at a location such that the WPC unit does not extend laterally beyond the wheel, to minimize the likelihood of damage to the WPC unit 110 as the host vehicle 112 moves between and around objects in narrow confines, as is typical of an industrial environment such as a warehouse, cargo dock, etc. In a preferred embodiment, each of the WPC power transmitter 118 and WPC power receiver 120 is generally circular in cross section, with a diameter of approximately 145 mm and a width of approximately 37 mm. It should be understood that, in other embodiments, other appropriate geometric shapes and/or sizes may be used.

Furthermore, the size of the WPC power transmitter 118 and the WPC power receiver 120, along with their respective positioning on the host vehicle 112 or attachment preferably does not much inhibit a load carried by the attachment to sit as close to the carriage 114 of the host vehicle 112 as is feasible. Specifically, when carrying cargo on an attachment to a host vehicle, the forward-aft weight distribution of a load is a limiting factor on how much weight the attachment can safely carry without unbalancing the host vehicle 112. Thus, as shown in FIG. 3, positioning both the WPC power transmitter 118 and the WPC power receiver 120 behind the carriage of the host vehicle beneficially does not reduce the load-carrying capacity of the attachment, which might otherwise be the case if the WPC power receiver, for example, were positioned on or in front of the carriage 14, or on the attachment.

Figure 4:
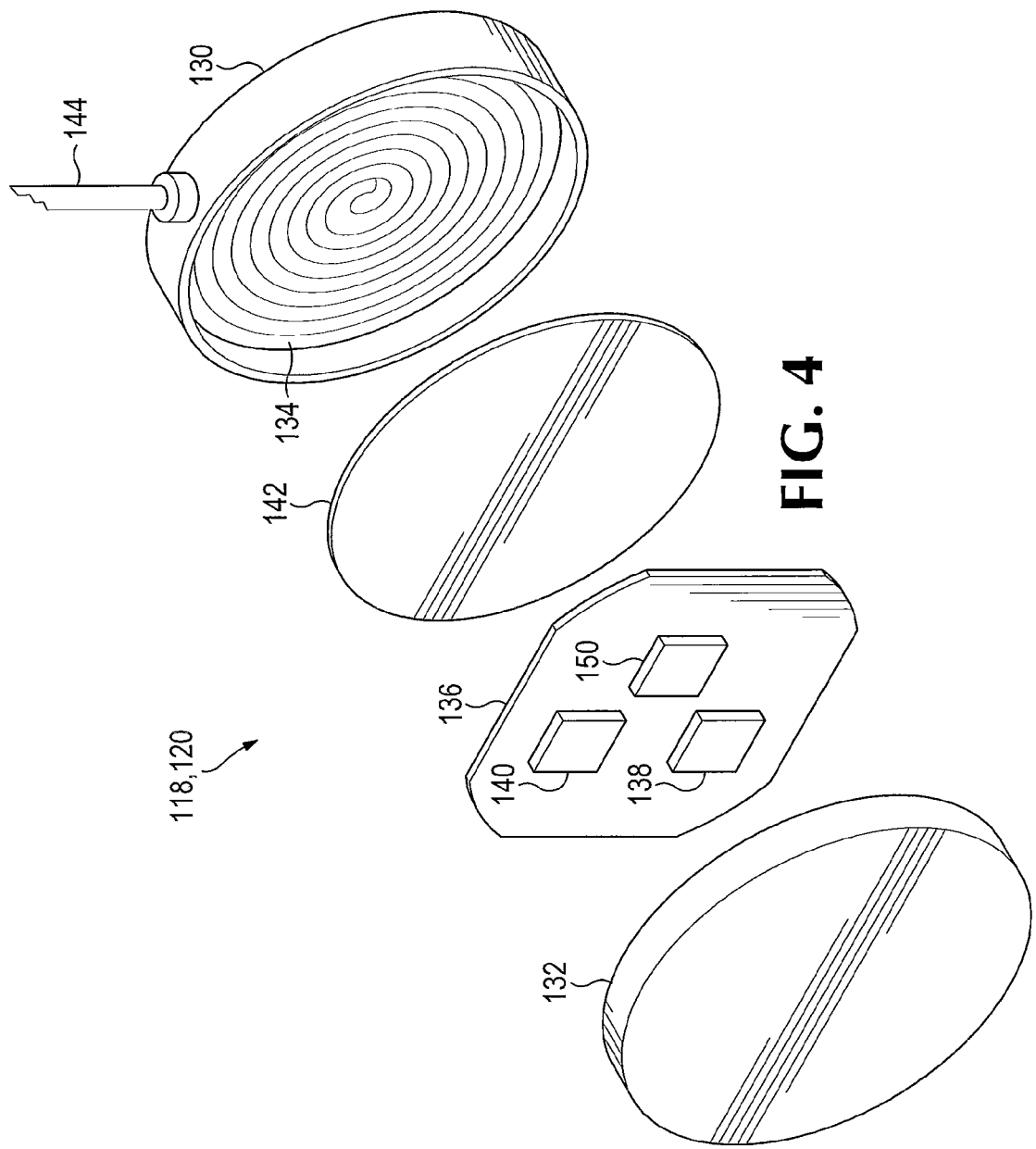
FIG. 4 shows an exploded view of the construction of the WPC transmitter and receiver.

FIG. 4 generally illustrates the construction of each of the WPC power transmitter 118 and the WPC power receiver 120, each including a housing 130 and a cover 132. Each of the housing and cover may be made of any appropriate material, such as carbon fiber or other hard plastic that does not interfere with inductive transfer between the WPC power transmitter 118 and the WPC power receiver 120. Nested inside the housing 130 is a coiled conductive wire 134 that provides inductance when carrying a current. In one preferred embodiment, the conductive wire 134 is coiled in a single spiral as shown in FIG. 4. Alternative embodiments may coil the wire through multiple spirals, if desired. In still other embodiments, and particularly where the WPC unit 110 is not of a circular cross section, the conductive wire 134 may be wound in spirals of different geometric shapes, e.g. a square, a hexagon, etc.

Spaced apart from the coiled conductive wire 134 by a plastic separator 142 is a circuit board 136 that includes circuitry 138 for communicating RF I/O signals between the WPC power transmitter 118 and the WPC power receiver 120, as well as circuitry 140 for communicating CAN bus signals and circuitry implementing a power management module 150 described in greater detail later in this specification. It should be understood that FIG. 4 illustrates the respective CAN circuitry 140, the RF I/O circuitry 138, and the power management module 150 schematically only, and that the particular circuitry may be integrated together and share components.

Figure 5:
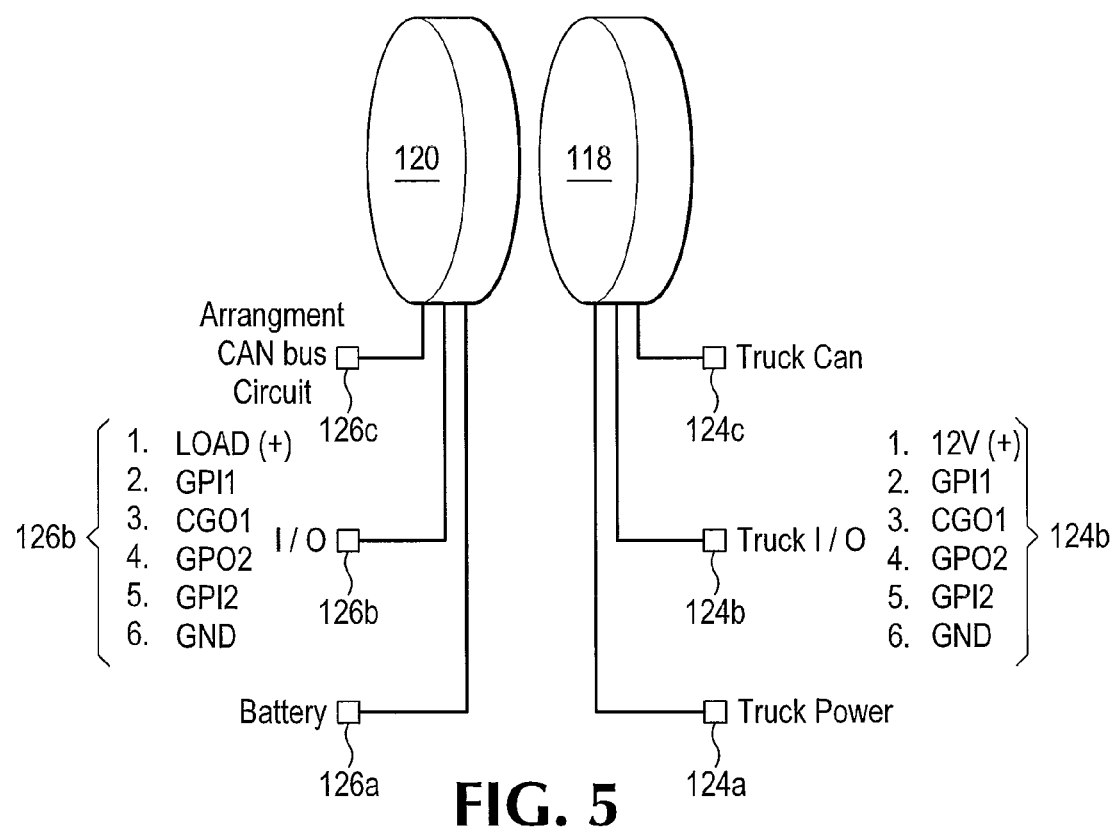
FIG. 5 shows an electrical schematic of the power, power switching, and communication channels between the WPC transmitter and receiver.

FIG. 5 shows in more detail the configuration of the RF I/O connections 124b and 126b of the WPC power transmitter 118 and WPC power receiver 120, respectively. Specifically, the RF I/O connection 124b on the WPC power transmitter 118 includes a 12V connector for connection to external truck mounted loads or other devices that can operate on truck power, two RF inputs to receive signals from local devices to be sent to the WPC power receiver 120, and two RF outputs from signal inputs at the WPC power receiver 120. In other embodiments, more RF inputs and/or outputs may be provided. The RF I/O connection 126b of the WPC power receiver 120, in turn, includes a 12V load line for connection to attachment mounted devices, two RF inputs to receive signals from local devices to be sent to the WPC power transmitter 118, and two RF outputs from signal inputs at the WPC power transmitter 118. In other embodiments, more RF inputs and/or outputs may be provided. Each of the CAN bus connections 124c and 126c include CAN high and low connections. The power connection 124a of the WPC transmitter 118 includes a 12V+ terminal for power provided by the host vehicle 10 along with a ground terminal, and the power connection 126a of the WPC receiver include connections to each of the positive and negative terminals of the battery on an attachment.

Inductive Power Transfer and Power Management

As noted previously, the WPC unit 110 includes a WPC power transmitter 118 that has a coil 134 capable of inductively, i.e. wirelessly, transferring power to a similar coil 134 on the WPC power receiver 120. Preferably, the WPC unit 110 is designed to be capable of directly powering devices on the attachment of a host vehicle 112, meaning that devices on the attachment may be operated using power received from the battery or other power source on the host vehicle 110 without contemporaneously using power from a battery mounted remotely on the attachment. However, as can be seen in FIG. 3, the WPC power transmitter 118 and WPC power receiver 120 may not always be in an aligned position to provide sufficient power when needed, or the power instantaneously needed on the attachment may exceed the power transfer capabilities of the inductive link between the WPC power transmitter 118 and WPC power receiver 120. To provide for such circumstances, in a preferred embodiment, the battery on the attachment to the host vehicle 112 is also capable of providing sufficient power to operate devices on the attachment.

Figure 6:
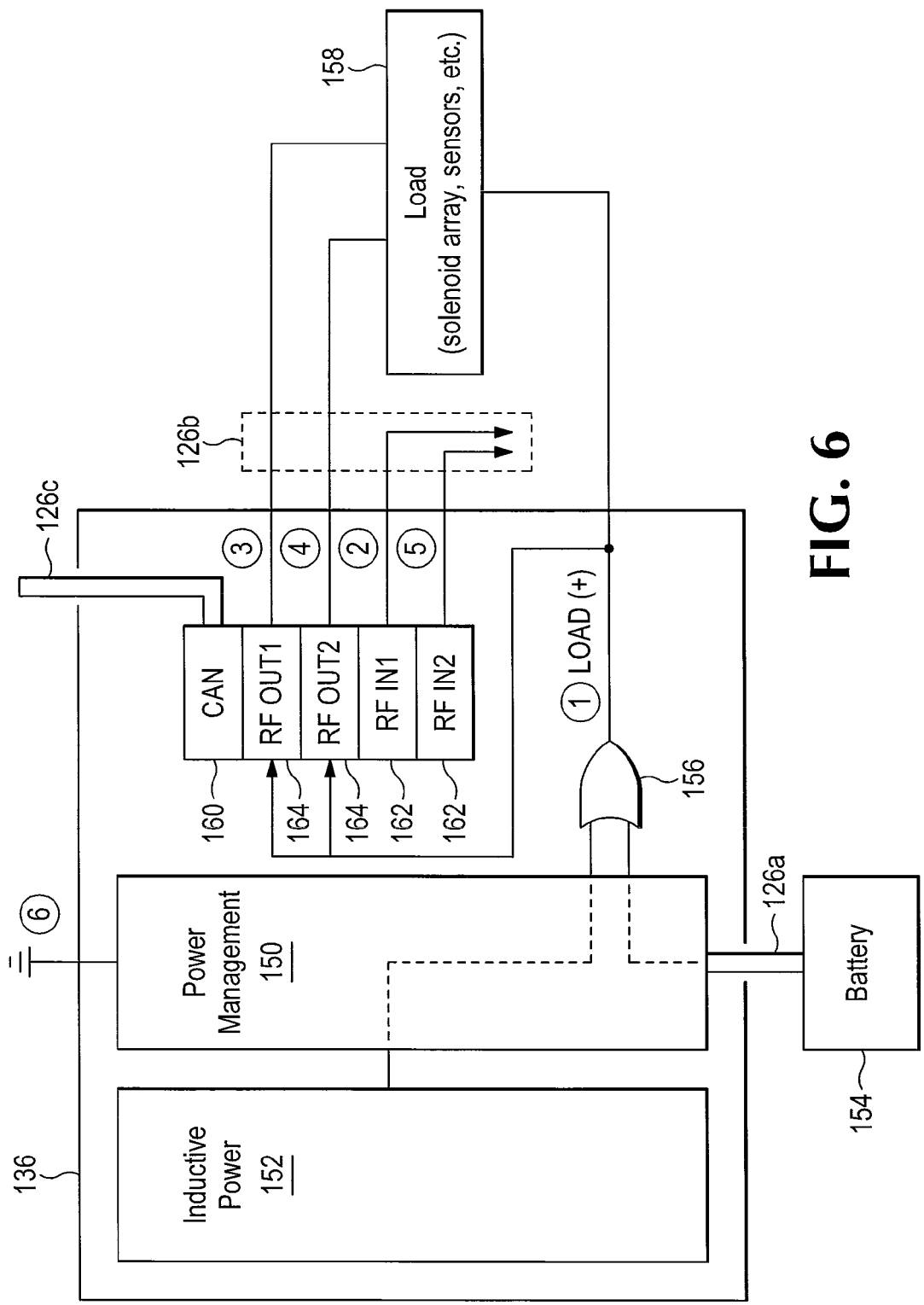
FIG. 6 shows an electrical schematic of the WPC receiver.

FIG. 6 illustrates a preferred system for circuitry in a WPC power receiver 120 that manages the power provided from both the WPC power transmitter 118 and one or more batteries 154 operating devices on the attachment so as to seamlessly switch the power supply to attachment devices from (1) being supplied only inductively from the WPC power transmitter 118; (2) being only supplied from the battery 154; and (3) being supplied inductively from the WPC power transmitter 118 and the battery 154, as well as to use inductive power from the WPC power transmitter 118 to recharge the battery 154 when power from the WPC power transmitter 118 is not needed to directly power devices on the attachment.

Specifically, a receiver-side circuit board 136 of a WPC power receiver 120 may preferably include a power management module 150 that may receive inductive power from a connection 152 on the circuit board 136 to the coil 134 in the WPC power receiver 120, and may also receive power from a connection to a battery 154 on an attachment 12 through connection 126a (also shown in FIG. 3). Both the connections to the battery 154 and the connection 152 from the inductive coil 134 are provided as inputs to a control device 156 that outputs power to loads 158 on the attachment, which may for example include a sensor array, a bar code reader, etc. The control device 156 also provides power to the GP output channels 164, which may be connected for example, to a solenoid array, lights, or other devices. Those of ordinary skill in the art will recognize that the control device 156 may in some embodiments be integrated into the power management module 150.

Figure 7:
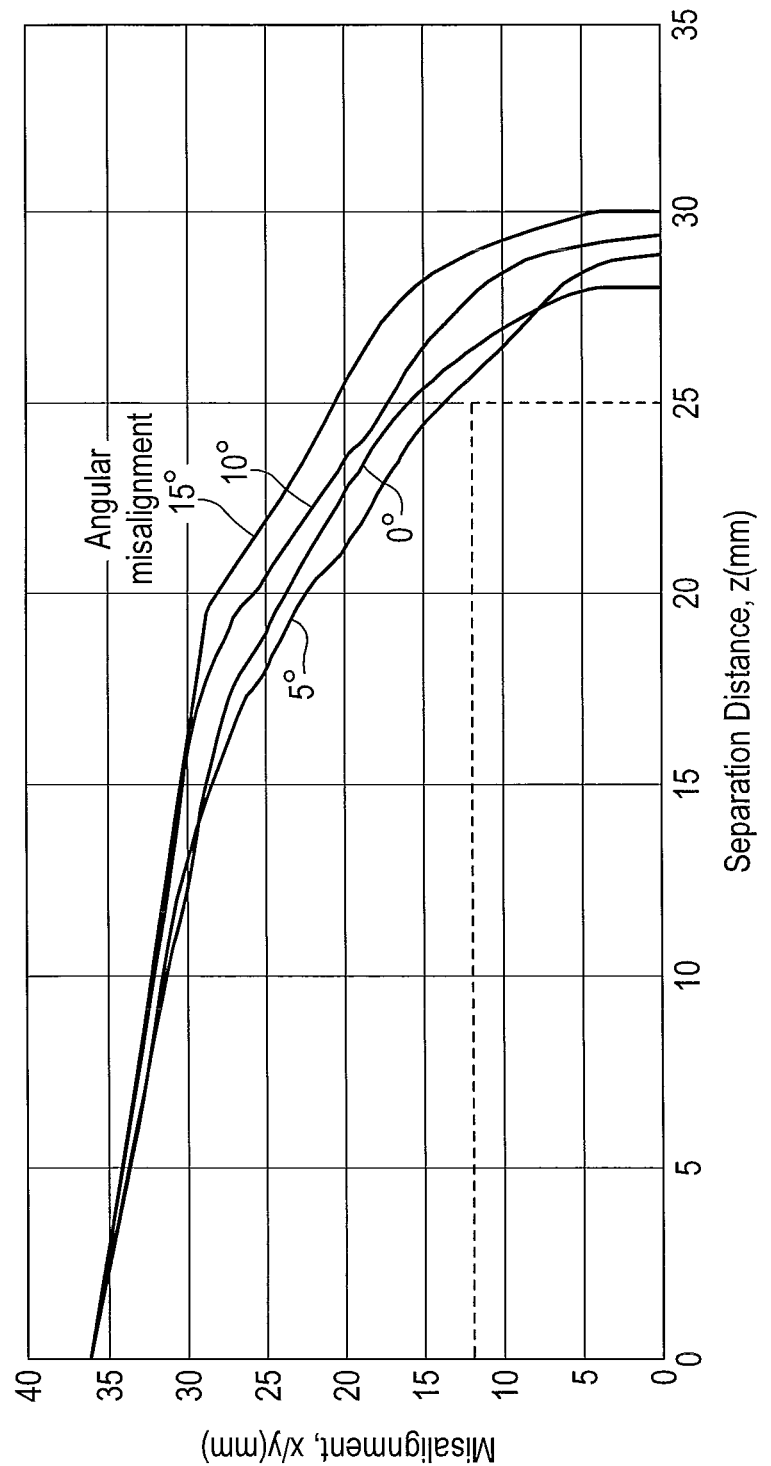
FIG. 7 shows inductive power transfer between the WPC unit as a function of lateral misalignment and separation distance.

In a preferred embodiment, maximum inductive current and power provided from the WPC power transmitter 118 to the WPC power receiver 120 is approximately 1 amp and 12 watts of power, respectively. Referring to FIG. 7, the inductive power provided decreases as a function of misalignment between the opposed surfaces of the WPC power transmitter 118 and receiver 120. For example, in the instance shown in FIG. 3 where the WPC power receiver slides vertically relative to the WPC power transmitter, inductive power transfer decreases gradually to a misalignment of approximately 12 mm (shown on the vertical axis from a maximum at the y-origin), then drops precipitously. Similarly, when the WPC unit 110 is mounted on host vehicles 110 and/or attachments 12 where, during operation the WPC power receiver 120 moves laterally away from the WPC power transmitter 118 (e.g. a push-pull attachment), power transfer drops gradually to about 25 mm separation, then drops precipitously. FIG. 7 also shows how inductive power decreases as function of the angular misalignment between the inductive surfaces of the WPC unit 110, as could occur for example, with an upender application.

The power management module 150 preferably provides power to the load 158 only from the inductive power connection 152, unless more power is needed by the load 158 than can be provided inductively from the WPC power transmitter 118 when, for instance the inductive surfaces of the WPC unit 110 are misaligned or more than approximately 1 amp or 12 W of power is required by the load 158. When such a circumstance occurs, the power management module seamlessly draws additional power from the battery 154 to satisfy the requirements of the load 158. Alternatively, when the power requirements of the load are less than 1 amp and 12 W of power, and the inductive power from the WPC power transmitter 118 is greater than needed to satisfy the load 118, the excess power is used to recharge the battery 154 on the attachment.

CAN Bus Communication

As seen in FIG. 6, the circuit board 136 on the WPC power receiver 120 includes a CAN module 160, as does the circuit board 136 on the WPC power transmitter 118 (not shown) and connected by the CAN connectors 126c and 124c, respectively. The CAN bus standard is a two-way message-based protocol designed to allow microcontrollers and devices to communicate with each other within a vehicle without a host computer. CAN is a multi-master serial bus standard for connecting Electronic Control Units [ECUs] also known as nodes, which may be devices such as sensors, actuators and control devices located on either the host vehicle 12 or the attachment. The CAN standard requires that each node include a host processor, a transceiver, and a CAN controller. Preferably, the circuit board 136 on each of the WPC power transmitter 118 and the WPC power receiver 120 includes circuitry that allows CAN messages to pass seamlessly between the WPC power transmitter 118 and the WPC power receiver 120 from ECUs connected to each through their own CAN connectors 124c and 126c. The respective host processors and CAN controllers for the host vehicle and attachment can be locally stored on each of these structures, with the circuit boards 136 on each of the WPC power transmitter 118 and receiver 120 merely providing the transceiver functionality.

CAN bus communications between the host vehicle 112 and the attachment may be used, for example, to transmit bar codes, sensor data, etc. between the attachment and the host vehicle 112. Preferably, the CAN bus communication channel has a continuous transmission range between the WPC power transmitter and the WPC power receiver of not less than thirty feet.

In many embodiments, a CAN communication network may include data representing status information of a very large number of components, both on the host vehicle, and on the attachment. Most of this CAN traffic may be unrelated to communication signals between a host vehicle 112 and an attachment necessary for hydraulic control of the attachment, yet would ordinarily be present in the communication channel between the WPC transmitter 118 and the WPC receiver 120, occupying bandwidth, and potentially interfering with control signals to and from the attachment and the host vehicle 112. Thus, in a preferred embodiment, the WPC unit 110 includes a list of CAN addresses relevant to hydraulic control of the attachment, and filters out CAN traffic originating from addresses not on the list, to optimize performance.

RF Input/Output Communication

Still referring to FIG. 6, the circuit board 136 on the WPC power receiver 120 preferably includes two RF inputs 162 to receive data from local sensors, switches or similar devices on an attachment to which the power receiver 120 is electrically connected. The circuit board on the WPC power receiver 120 also preferably includes two RF outputs 164 to receive RF data from the WPC power transmitter 118. Referring to FIG. 5, the RF inputs 162 may be respectively connected through terminals 2 and 5 of the RF I/O connector 126b to selectively applicable sources of RF data for communication to the WPC power transmitter 118, while the RF outputs 164 may be connected, through terminals 3 and 4 respectively of the RF I/O connector 126b to desired loads on the attachment.

When the RF outputs 164 receive a signal from the WPC power transmitter 118 to activate one or more solenoids, for example, the power management module provides power for the switching signal to the solenoids through the terminals 3 and/or 4, as applicable, and also provides the power through the load terminal 1 from the control device 156 to actuate the solenoids as instructed by the switching signal. In a preferred embodiment, the power management module, through the control device 156, and using the inductive power connection 152 and the battery 154, is configured to provide total power per RF output channel 162 of 3 amps maximum per channel and 5 amps maximum total. It should be understood by those skilled in the art that more power may be provided per channel and/or in total, depending upon the application required, as well as the amount of power available from the inductive channel in the WPC unit 110 and the battery 154 on the attachment.

Those of ordinary skill in the art will understand that, though FIG. 6 schematically illustrates the RF circuitry for the WPC power receiver 120, similar circuitry exists in the WPC power transmitter 118. That is to say, the WPC power transmitter 118 may include two RF inputs that receive control signals intended to be communicated to the RF outputs 164 of the WPC receiver, to thereby operate loads or other devices on an attachment. Similarly, the WPC power transmitter 118 may include two RF outputs that receive signals from the RF inputs 162 of the WPC power receiver 120.

As can be appreciated from FIG. 6, the power output of the WPC power receiver 120 is preferably capable of providing power to the load 158, under the entire range of operating conditions of the attachment, regardless of the relative position of the WPC power receiver 120 with respect to the WPC power transmitter 118. If, for example, the WPC power transmitter 118 and receiver 120 are in optimal alignment, up to 1 amp and 12 watts of RF power may be provided inductively, while the battery also recharges. If more RF power is needed while the WPC power transmitter 118 and receiver 120 are in optimal alignment, the power management module 150 may draw on the battery to provide that power up to 3 amps maximum per channel and 5 amps maximum total (or other applicable limits, depending on the application). Furthermore, if the WPC power transmitter 118 and receiver 120 are not in optimal alignment, even so much so that no inductive power is provided to the WPC power receiver 120, the WPC power receiver may nonetheless still provide 3 amps maximum per channel and 5 amps maximum total to the load 158.

Figure 8:
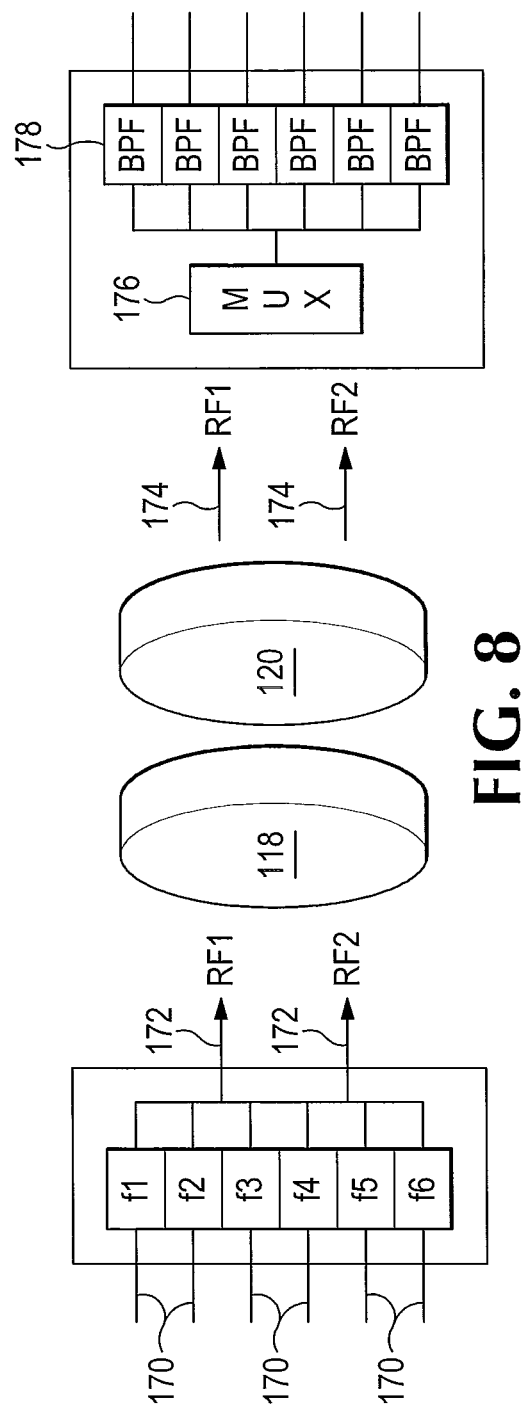
FIG. 8 shows an alternative RF communication link between the WPC transmitter and the WPC receiver capable of transmitting an arbitrary number of RF signals over two RF communication channels.

The WPC unit 110 as shown in FIGS. 3-6 is capable of simultaneously providing four independent RF channels between the WPC power transmitter 118 and receiver 120, two in each direction. FIG. 8 illustrates one example of an alternate embodiment that is capable of using those four independent channels to control a larger number of devices that might be present on the attachment and/or host vehicle 12. Specifically, a host vehicle may be capable of sending a large number of independent RF signals to the attachment (six as shown in FIG. 8), where each RF signal is assigned its own unique frequency band. In some embodiments, the respective bands of the RF signals may be separated by guardbands to prevent signal interference between them. Each of these signals may be output onto a selected one of the two independent RF channels 172 sent to the WPC power receiver. In the case where more than two of the signals 170 attempts to be simultaneously sent with only two independent channels available, a controller (not shown) may schedule transmission to avoid conflicts. The signals propagated along the RF channels 172 into the WPC power transmitter 118 are wirelessly transmitted to the WPC power receiver 120, where each signals is in turn propagated along a corresponding RF channels 174 to a multiplexer 176, which sends each signal to each one of a series of bandpass filters 178. The bandpass filters 178 each have a frequency range corresponding to the particular solenoid or other RF-operated device to be controlled using the respective frequency bands 170. Essentially, each bandpass filter 178 rejects any signal not having a frequency corresponding to the device to which it is attached. In this manner, any desired number of functions may be implemented through wireless RF signaling between the WPC power transmitter 118 and receiver 120, by sequentially transmitting those signals over a respective one of the independent RF channels 172 and 174, as needed.

Sleep Mode

In some embodiments, it may be desirable to reduce power drawn from the battery on the attachment from the WPC power receiver 120, during times when the WPC power transmitter 118 is powered off and unable to provide inductive power and/or signaling. Thus, the circuit board 136 may include "sleep mode" circuitry capable of: (1) turning off all power outputs from the WPC power receiver 120 during time intervals when no inductive power is received from the transmitter and no switching signals are received from the WPC power transmitter 118; (2) providing low power to the RF circuit to periodically sample the RF channels between the WPC power transmitter 118 and the WPC power receiver 120; and (3) waking the WPC power receiver 120 from sleep mode to provide output power to the attachment. In some embodiments, an accelerometer may be included in the WPC power receiver 120 that detects vibration, which indicates that the host truck power is on and thus the WPC power transmitter 118 is available to provide Inductive Power and RF data communication.

For example, in some embodiments, the WPC power receiver may be configured to wake from sleep mode either (1) when an included accelerometer detects vibrations, (2) when inductive power is received from the WPC transmitter 118, or (3) when an RF signal is detected by sampling the RF channel between the WPC power transmitter 118 and the WPC power receiver 120. Alternately, sleep mode may be activated when no inductive power and no switching signals have been received from the WPC transmitter 118.

Time-Averaged Inductive Power Transfer Maximization

Figure 9:
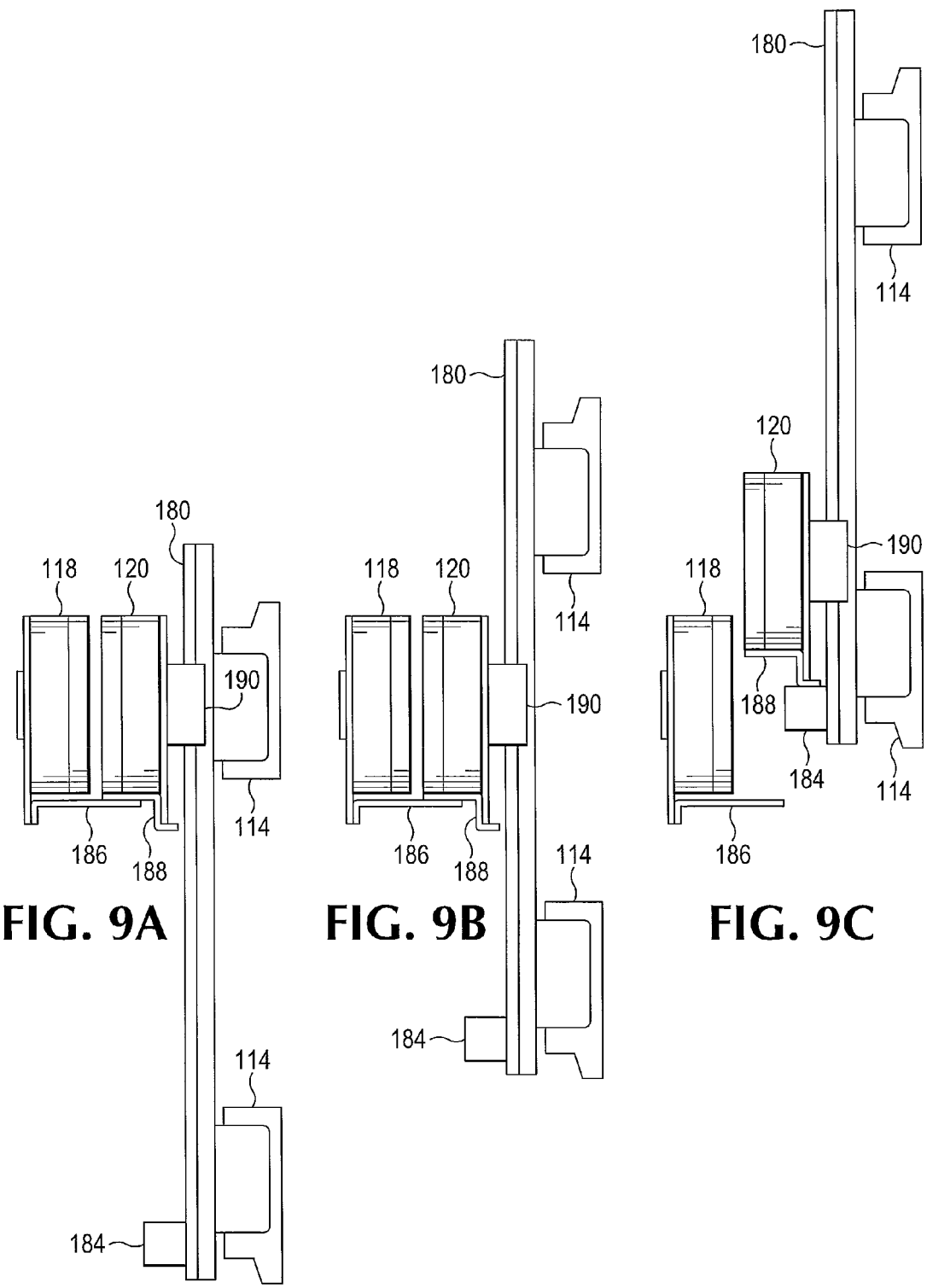
FIGS. 9A-9C show a WPC receiver mounted to a carriage through a mechanism that improves time-averaged power transfer from the WPC transmitter.

As noted previously, and with specific reference to FIG. 7, the amount of inductive power transfer between the WPC power transmitter 118 and the WPC power receiver 120 is sensitive to the alignment between these two units. FIGS. 9A to 9C illustrate one embodiment of a mounting mechanism that permits the carriage 114 of the host vehicle 12 to move with respect to the host vehicle 12 over a preselected distance without concurrently moving the WPC power receiver 120 relative to the WPC power transmitter 118.

Specifically, the WPC power transmitter 118 may be mounted to the frame of the host vehicle 12 using a transmitter bracket 186 that extends parallel and away from the bottom surface of the WPC power transmitter 118. The WPC power receiver 120 may in turn be mounted to the carriage 114 of the host vehicle 12 using an assembly comprising a sliding rail 180, a sleeve 190, and a bracket 188. Specifically, the bracket 188 includes a vertical portion rigidly affixed to the back of the WPC power receiver 120, and a horizontal portion upon which the WPC power receiver 120 rests. The sleeve 190 slideably engages the rail 180, and is rigidly affixed to the vertical portion of the bracket 188. The rail 180 is in turn rigidly affixed to the carriage 114.

In a resting position shown in FIG. 9A, where the WPC power transmitter 118 and receiver 120 are in optimal alignment and the carriage 114 is in its lowermost position, the horizontal portion of the bracket 188 rests on top of the bracket 186, preventing the WPC power receiver 120 from moving downwards relative to the WPC power transmitter 118. As the carriage lifts upwards as shown in FIG. 9B, the rail 180 may slide within the sleeve 190 while the WPC power receiver 120 remains in place due to its weight. Attached at the base of the rail 180, however, is a block 184 that as the carriage continues its upward motion, eventually catches a protruding portion of the bracket 188 and thereby lifts the WPC power receiver 120 out of alignment as shown in FIG. 9C. Conversely when the carriage 114 lowers back to the resting position of FIG. 9A, the weight of the WPC power receiver 120 causes it to follow along the downward path until the bracket 188 catches on the bracket 186.

As can be seen in FIGS. 9A-9C, this novel arrangement permits the carriage 114 to move relative to the mast of a host vehicle 10 by a distance greater than the diameter, height, width, or other appropriate dimension of the WPC unit 110 while still providing inductive power between the WPC power transmitter 118 and the WPC power receiver 120. Stated differently, the disclosed structure allows the carriage 114 of the host vehicle 110 to move throughout a range of motion (vertical, horizontal, tilting etc.) without diminishing or otherwise inhibiting the ability of the WPC transmitter 118 to deliver inductive power to the WPC receiver 120, and by extension to the attachment and/or a battery operating devices on the attachment.

In a preferred embodiment, the length of the sliding rail is not less than 12 inches. The inventors have determined that with this range, the WPC power transmitter 118 and receiver 120 are in the optimal alignment more than 80% of the time during normal operation of a Hi/Lo carton clamp application, for example, and that this configuration eliminates the need for battery changes. It should be understood, however, that other usages may require rails of different lengths. It should also be understood that the arrangement of FIGS. 9A to 9C is exemplary only, as different structures may also permit a ride range of motion of a carriage of a host vehicle 10 without corresponding relative movement of the WPC power transmitter 118 and receiver 120 from their optimal alignment. For example, with an upender application where the carriage tilts angularly away from a lift truck when "upending" a load, a curved rail 180 turned 90 degrees along a vertical axis from what is shown in FIGS. 9A to 9C may be more appropriate.

As can be appreciated from FIGS. 9A-9C, and also with reference to FIG. 6 and the disclosed WPC unit 110 in combination with the mounting mechanism just disclosed, permits devices on the attachment to receive power as needed and without interruption, during the full range of operation of the attachment, while dramatically preserving the charge state on the attachment's battery. During a significant portion of the time that an attachment is being used, attachment-side devices may be powered using inductive power received directly from the host vehicle. Moreover, by routing battery power also through the WPC receiver 120 the power management module 150 may seamlessly also draw on the attachment's battery to power those devices whenever the inductive power is insufficient—either because more power is required than can be delivered inductively or because the WPC power receiver 120 is no longer aligned with the WPC power receiver 118 should the attachment move beyond the range that the mounting mechanism maintains alignment for the WPC unit 110.

Stated differently, the disclosed mounting mechanism dramatically increases the time when an attachment-side device may be operated without drawing power from the battery on the attachment. Yet, by also routing power from the attachment's battery through the WPC receiver 120, the power management module 150 can ensure that those attachment side devices will not see any interruption in power even when the inductive power from the WCP transmitter 118 is interrupted or when load requirements increase beyond that which can be provided inductively. During such intervals, the power management module 150 can seamlessly draw on power from the attachment's battery because that power is delivered to loads over the same channel as was the inductive power from the WPC power transmitter 118. Moreover, when the attachment is moved to a position such that the WPC power receiver 120 returns to alignment with the WPC power transmitter 118, inductive power may be again used to directly power attachment-side devices, seamlessly and without interruption, so that the draw on the attachment's battery is reduced or eliminated, and so the battery may be recharged.

Those of ordinary skill in the art will appreciate that, although the disclosed mounting mechanism for the WPC unit 110 provides the benefit of maintaining an aligned relationship between the WPC power transmitter 118 and WPC power receiver 120 as the carriage and/or attachment moves relative to the host vehicle, in some embodiments the disclosed mounting mechanism may be omitted while still retaining the benefits associated with the WPC unit 110, e.g., seamless power switching between inductive/battery power etc.

Side-Shifting Fork Positioner Application

Figure 10:
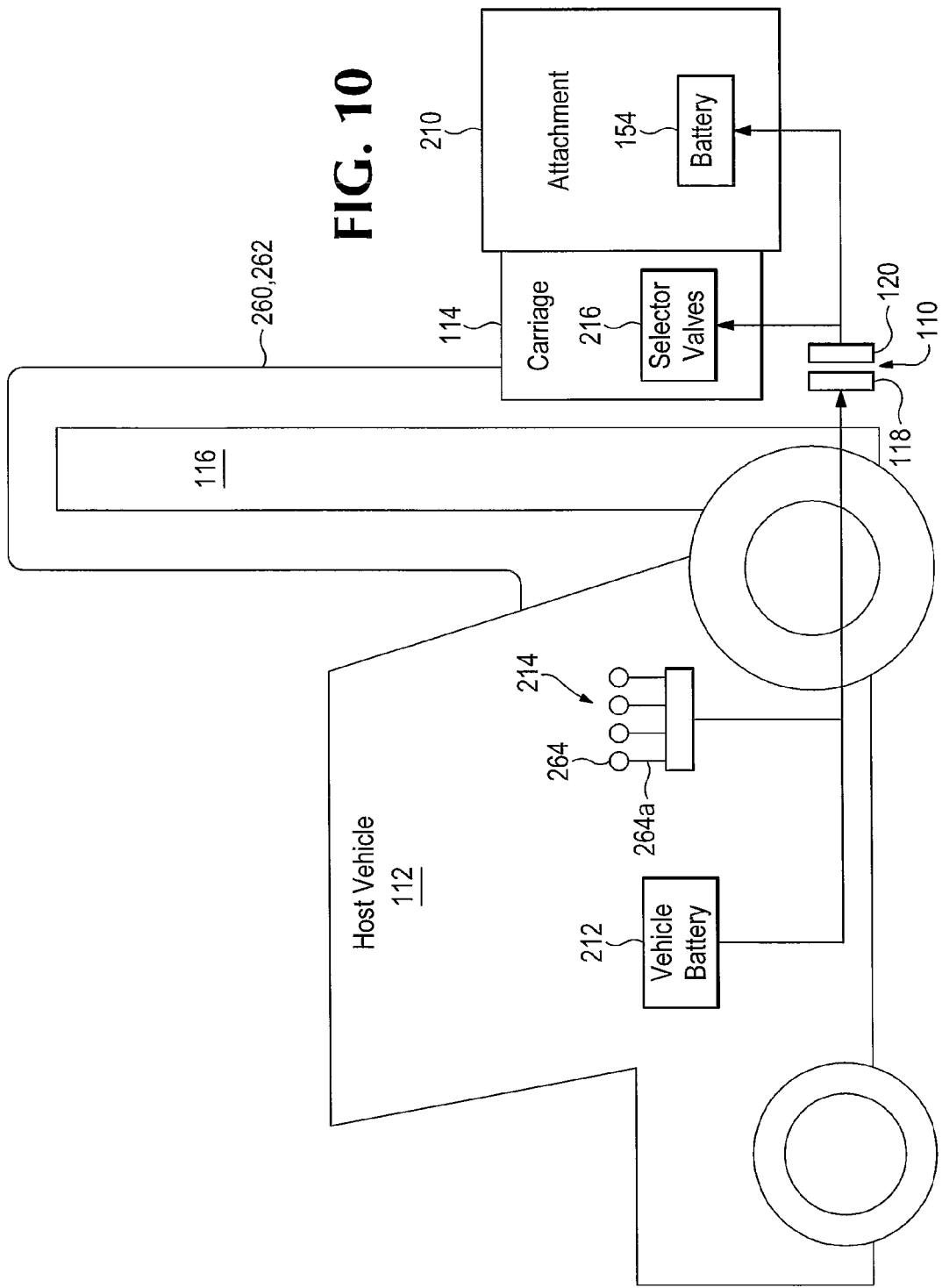
FIG. 10 shows a lift truck attached to a side-shifting fork positioner, operated using the WPC transmitter and receiver.

FIG. 10 schematically shows a side-shifting fork positioner attachment 210 to a host vehicle 112. The host vehicle 112 (lift truck) includes a WPC power unit 110 comprising a transmitter 118 and receiver 120, as described earlier, and used to convey power from the vehicle battery 154 and RF control signals from the manual actuators 214 to the solenoid selector valve array 216. The solenoid selector valve array 216, though shown in FIG. 10 as being mounted on the carriage, may instead be mounted on the attachment. Similarly, though FIG. 10 shows the WPC receiver 120 being connected directly to the selector valves 216 on the carriage 214, other implementations, such as those with a controller mounted on the attachment 210, may have the output connections from the WPC receiver 120 all connect to the attachment 154, with other connections (not shown) from the attachment to the selector valve array 216. Pressurized hydraulic fluid is carried to the selector valve array 216 via two hydraulic lines 260, 262 (only one of which is shown in FIG. 10).

Figure 11:
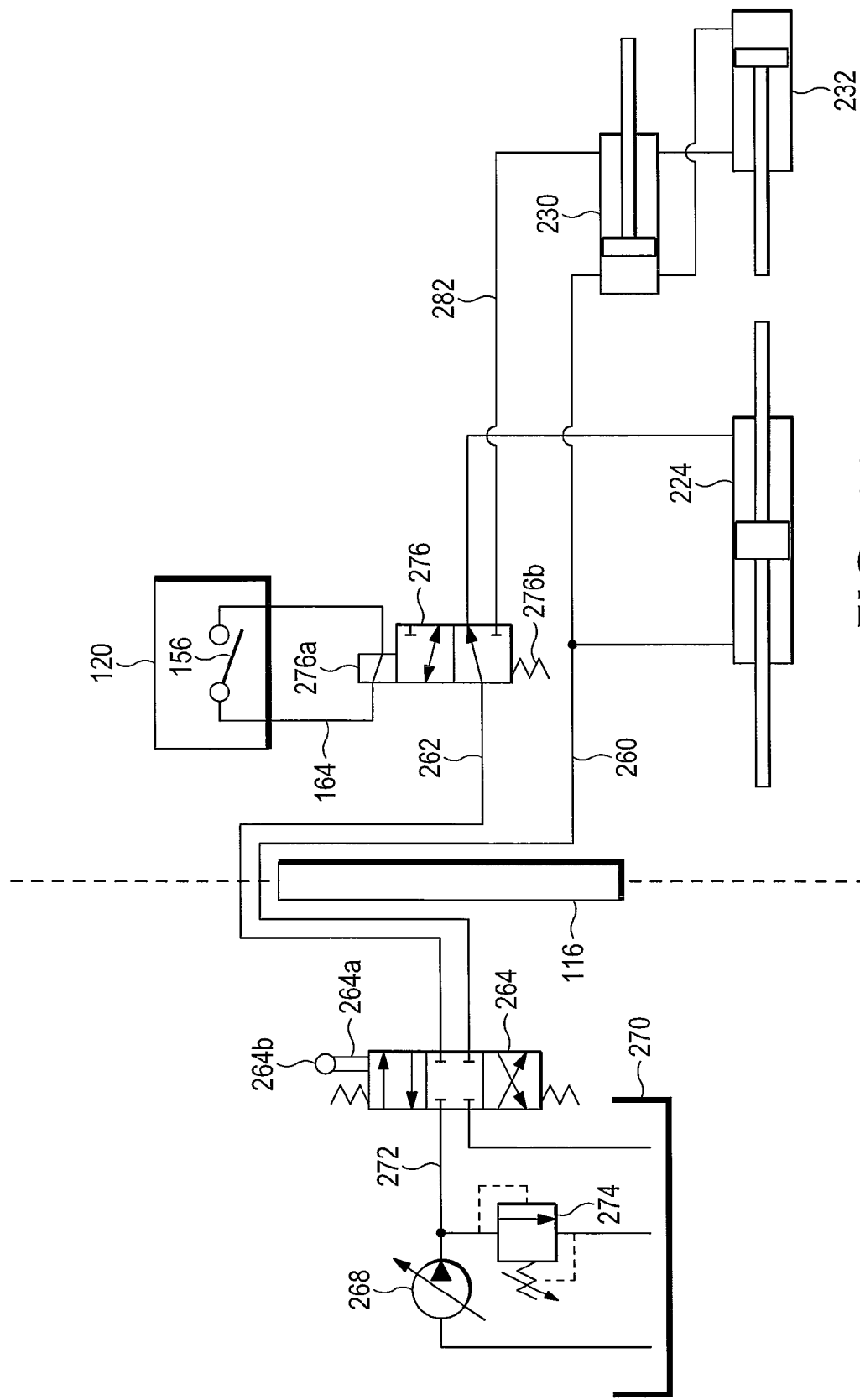
FIG. 11 shows a circuit diagram of the side-shifting fork positioner of FIG. 9.

FIG. 11 is a schematic circuit diagram of an exemplary wireless hydraulic control system which may optionally be used for the side-shifting fork-positioner 210. However a system of this type would also be applicable to a side-shifting load clamp, especially one having parallel sliding clamp arms. A hydraulic circuit such as that shown in FIG. 11 enables the lift truck operator to control side-shifting functions and fork-positioning functions separately, utilizing a single control valve 264 on the truck body having a handle 264a upon which an electrical switch 264b is mounted. The single pair of hydraulic lines 260 and 262 communicate between the lift truck 112 and the vertically-movable load handler 210 by extending over the lift truck's mast 116, employing a line take up device such as a conventional hose reel to accommodate the variable vertical positions of the load handler relative to the lift truck body.

In the circuit of FIG. 11, engine-driven hydraulic pump 268 of the lift truck 112 pumps hydraulic fluid under pressure from a reservoir 270 through a line 272 to the operator's control valve 264. A relief valve 274 provides protection against excessive pressure in line 272. If the operator manually moves the spool of the valve 264 downwardly from its centered position as seen in FIG. 11, pressurized fluid from line 272 is conducted through line 262 to a solenoid-operated hydraulic selector valve 276 of the load handler, within the valve array 216 shown in FIG. 10. The spool of valve 276 is spring-biased upwardly as seen in FIG. 11, such that the fluid in line 262 operates a first hydraulic actuator and function wherein the fluid is conducted to one end of the side-shifting piston and cylinder assembly 224, causing the piston to shift toward the left as seen in FIG. 11 while fluid is simultaneously exhausted through line 260 and valve 264 to the reservoir 270. Alternatively, if the operator wishes to side-shift in the opposite direction, he manually moves the spool of the valve 264 upwardly as seen in FIG. 11, which conducts pressurized fluid from line 272 to line 260, shifting the piston in the opposite direction while exhausting fluid through line 262 and valve 264 to the reservoir 270.

If, instead of actuating the side-shifting piston and cylinder assembly 224 in one direction or the other, the operator wishes to operate a second hydraulic actuator in the form of fork-positioning cylinders 230 and 232, he controls this second function of the load handler using the same valve 264 while simultaneously manually closing switch 264b, such as by a push button on the handle 264a. Closure of the switch 264b causes the WPC power transmitter 118 to transmit an RF signal to the WPC power receiver 120, an RF GP output, which in turn propagates a signal to the GPO switch 156 in WPC receiver 120.

The GPO switch 156 will respond to the RF signal initiated by the operator's closure of switch 264b by energizing solenoid 276a of function-selector valve 276 and moving its valve spool downwardly as seen in FIG. 11 against the force of spring 276b. This movement of the valve 276 places a hydraulic line 282 into communication with line 262. If the operator has moved the spool of valve 264 downwardly, line 282 causes retraction of the fork-positioning piston and cylinder assemblies 230 and 232 by receiving pressurized fluid from line 262, thereby causing fluid to be exhausted from the piston and cylinder assemblies 230 and 232 through line 260 and valve 264 to the reservoir 270. Such retraction of the piston and cylinder assemblies 230 and 232 narrows the separation between the forks of the fork-positioning load handler 210. Conversely, the operator's upward movement of the spool of valve 264 while closing switch 264b conducts pressurized fluid through line 260 to extend the piston and cylinder assemblies 230 and 232 to widen the separation between the forks, while fluid is exhausted through line 282, valve 276, line 262 and valve 264 to the reservoir 270.

As noted previously, the WPC receiver 120 receives inductive power, augmented by the battery 154 on the side-shifting fork positioner when necessary to operate the solenoid 276a and the GPO switch 156, as well as sending control signals to the GPO switch 156.

Carton Clamp Application

Figure 12:
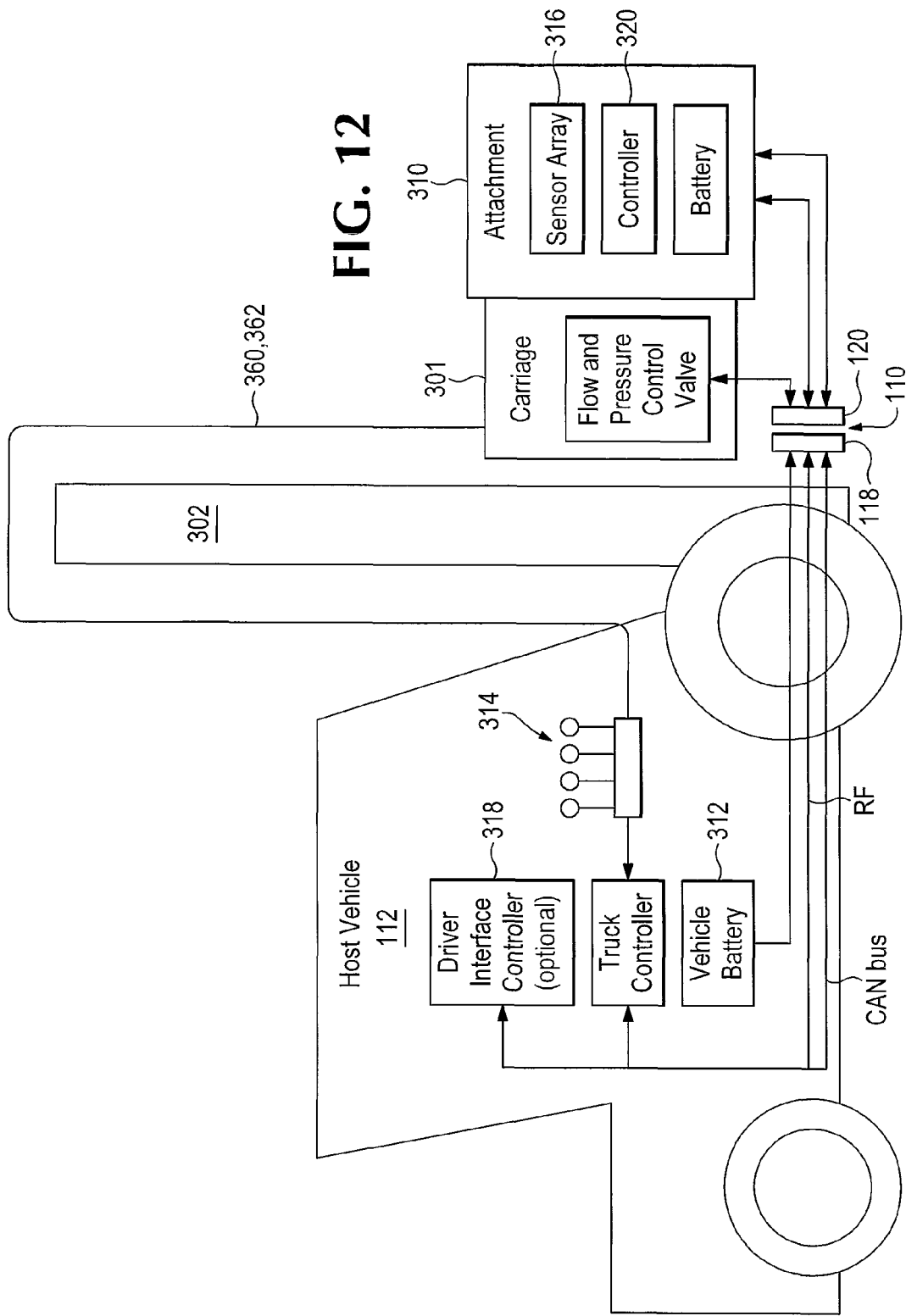
FIG. 12 schematically shows a system comprising a lift truck attached to an attachment, such as a carton clamp attachment, operated using the WPC transmitter and receiver to convey data from the attachment to the lift truck, and used by the lift truck to control the attachment.

FIG. 12 schematically shows a host vehicle 112 connected to an attachment 310, which may be a carton clamp attachment, for example. The host vehicle 112 (lift truck) includes a WCP power unit 110 comprising a transmitter 118 and receiver 120, as described earlier, and used to convey power from the vehicle battery 312 along with any RF control signals needed to power devices on the attachment 310, as also described earlier, and using the manual actuators 314. Pressurized hydraulic fluid is carried to the attachment 310 via two hydraulic lines 360, 362 (only one of which is shown in FIG. 12).

In addition, the host vehicle 112 is configured to receive one or more signals based on data from a sensor array 316 on the attachment 310 and used to control the amount of pressure provided in lines 360, 362. As described in further detail below, the data provided from the sensor array 316 may be provided directly to an optional driver interface controller 318 on the host vehicle, which uses the provided data to determine an appropriate line pressure, or alternatively, the data from the sensor array may be provided to a controller 320.

Figure 13:
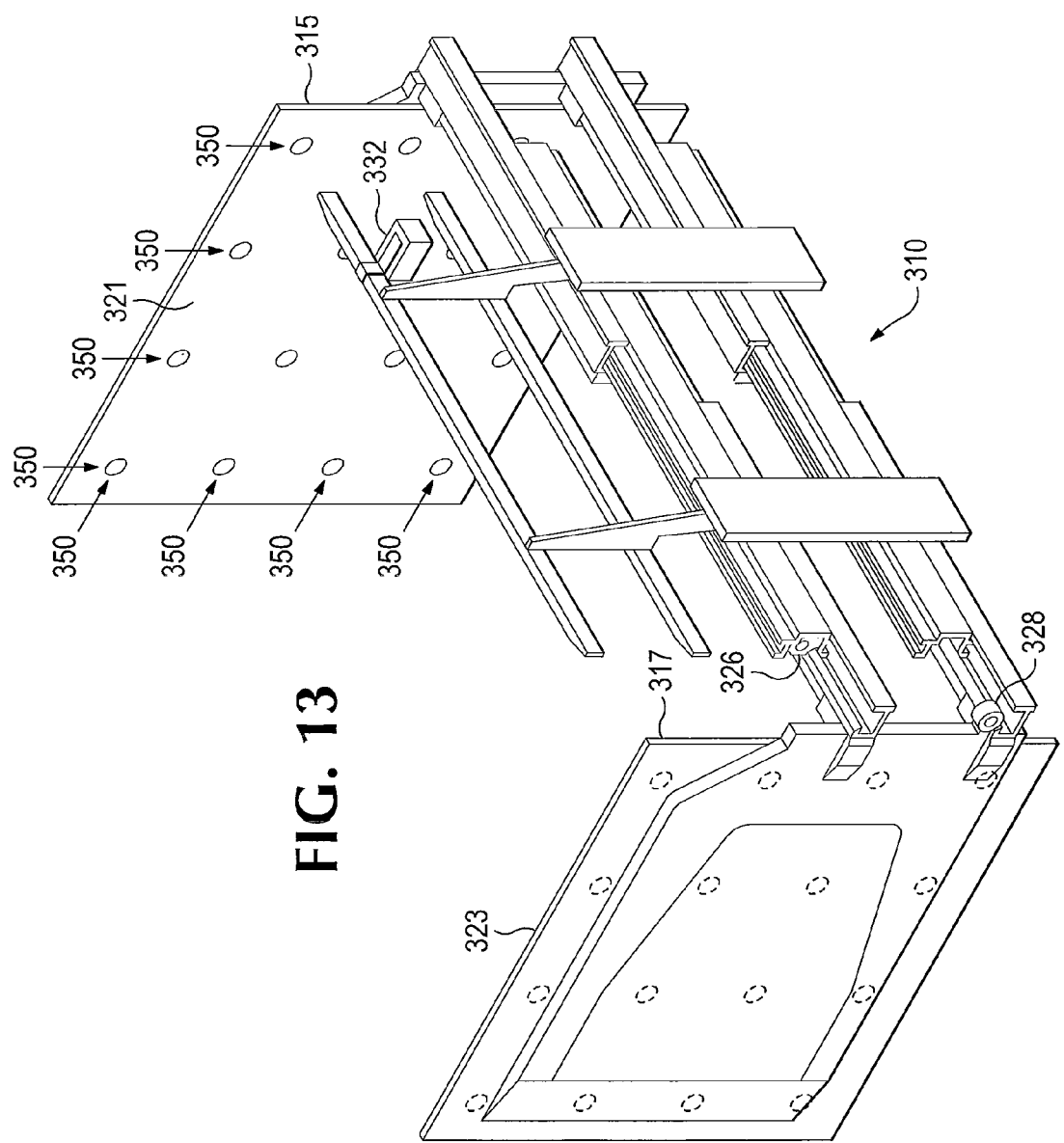
FIGS. 13 and 14 show a carton clamp attachment usable with the system of FIG. 12.
Figure 14:
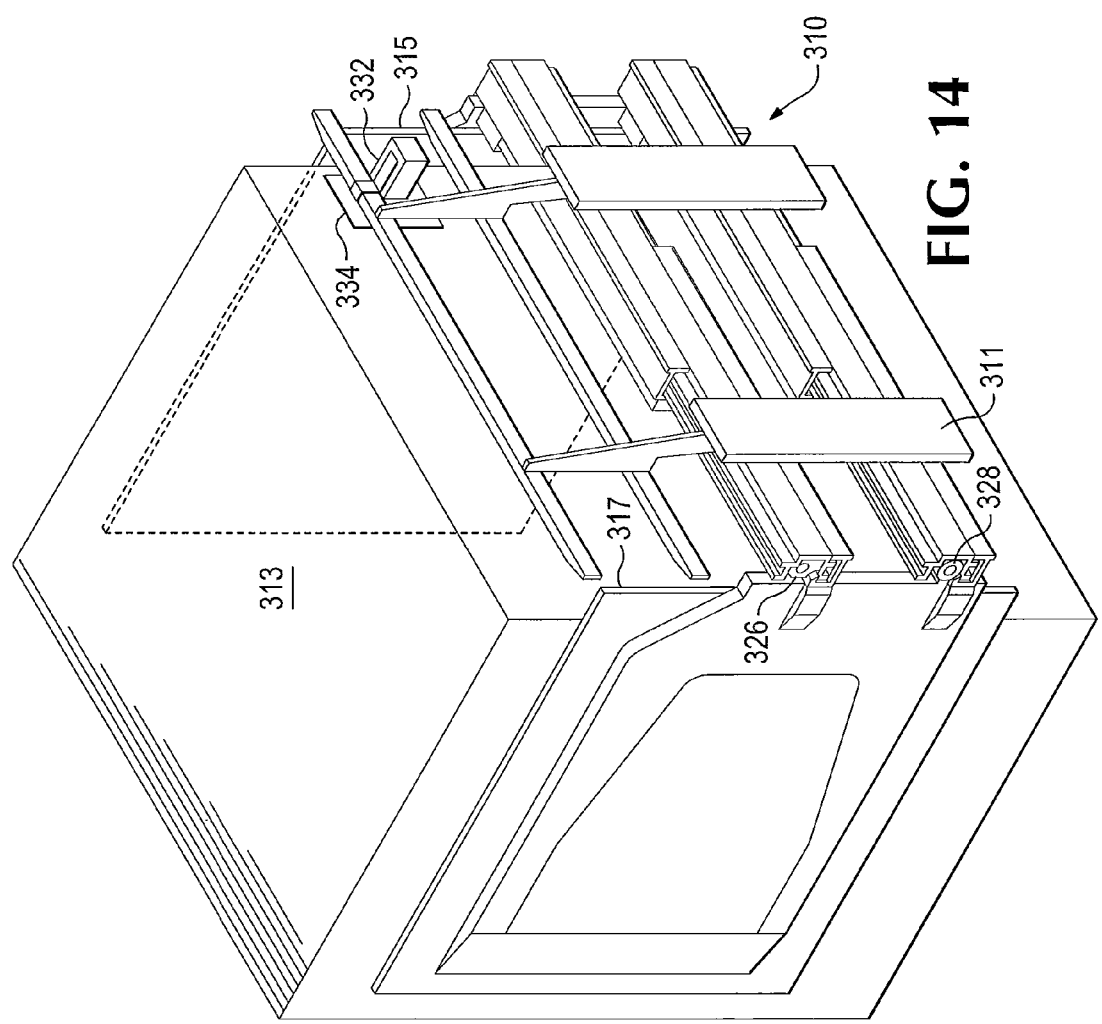

FIGS. 13 and 14 show a carton clamp 310 that may be used as an attachment in the system shown in FIG. 12, the functionality of which will be provided as background to illustrate the utility of the WPC transmitter 118 and WPC receiver 120 used in accordance with the system shown in FIG. 12. Specifically, the exemplary carton clamp 310 may be a hydraulically-powered, slidable-arm clamp having a frame 311 adapted for mounting on a lift truck carriage 301 (shown in FIG. 12) which is selectively reciprocated linearly along a conventional tiltable upright hydraulically-powered load-lifting mast 302. The particular exemplary slidable-arm clamp 310 depicted in the drawings is typically used to handle prismatic objects such as cartons or packages 313 in FIG. 14, and could be of any suitable slidable arm design. Clamp arms 315, 317 may be slidable selectively away from or toward one another perpendicular to the plane of load engaging surfaces 321, 323. Hydraulic cylinders 326, 328 selectively extend or retract respective clamp arms 321, 323. As can be appreciated, a carton such as 313 could be damaged if subjected to excessive over-clamping to prevent frictional grasp of the carton clamp 310.

Although a hydraulically-operated carton clamp 310 is described herein as an exemplary embodiment, other load clamps have features similar to the ones described. For example, a hydraulically operated pivoted-arm paper roll clamp could be configured in accordance with the present load clamping system.

The canon clamp 310 may include a data receiver, such as an electronic code reader 332 disposed on the clamp 310. Items to be clamped may thus be advantageously tagged with coded labels 334. The coded label 334 may preferably contain information sufficient to assist in determining, as will be described hereafter, an appropriate maximum clamping force for the labeled item. The coded label 334 may, for example, communicate a digital data string containing the item's LOAD ID, or other direct or indirect characteristic-identifying indicia. A load may include one or more labeled cartons or packages 313 and therefore the appropriate clamping force for the individual labeled item may or may not be appropriate for the entire load. Embodiments of the present system utilize the communications channels between the WPC transmitter 118 and WPC receiver 120, as will be described later, to make this determination.

The electronic code reader 332 is positioned to read the coded label 334 on at least one item making up a load presented to the load handling clamp 310. The electronic code reader 332 may operate automatically, for example by searching for a coded label whenever the clamp arms are in an open position or whenever a load is detected between the clamp arms, as will be described in more detail below. Alternatively, the electronic code reader may be operated manually by the clamp operator. The coded label 334 and electronic code reader 332 may respectively be a bar code and bar code scanner, radio frequency identification (RFID) tag and RFID reader, or other machine readable label and corresponding reader combination. In the case of an RFID system, the clamp's RFID reader may be limited such that it only detects RFID tags disposed between the clamp arms 315, 317. The LOAD ID or other load indicia may alternatively be input by the clamp operator, for example where a coded label is rendered somehow unreadable or if an item is incorrectly labeled.

The electronic code reader 332 transmits the information read from a coded label 334 to a controller, which may be the controller 320 shown in FIG. 12 on the attachment 310 (carton clamp) or the controller 318 on the host vehicle 112, depending on the configuration of the system shown in FIG. 12, and which will be described later in the specification. The controller 320 (or 318) parses the information to identify the LOAD ID or other identifying indicia. This is accomplished in whatever manner is required by the particular implementation of the particular embodiment of the present system being used.

When the clamp arms 15, 17 are in an open position the arms partially define a three dimensional clamping region. In order to clamp a load, the clamp operator positions the clamp arms 15, 17 such that the load is disposed in the clamping region. Load geometry sensors 350 are in data communication with the controller 318 or 320, and are disposed on respective load-engaging surfaces 321, 323. The load geometry sensors 350 are oriented inwardly, generally in the direction of the opposing surface 321, 323.

Each load geometry sensor 350 absorbs and dynamically modulates a characteristic of the communication medium between it and the controller 318 or 320 as a function of the absorbed stimuli. In certain embodiments of the present system, the sensors 350 may for example be infrared-beam sensors, such as the GP2XX family of IR Beam Sensors, commercially available from Sharp Corporation.

An example of such a sensor includes an emitter component, a detector component, an analog output and internal circuitry. The sensor emits a beam of infrared (IR) light. The beam of IR light travels through the clamping region until it encounters an obstruction, e.g. an interfering surface of a load or, in the absence of a load, the opposing load engaging surface. Preferably, but not essentially, the interfering surface is parallel to the load engaging surface and the beam is emitted in a plane perpendicular to the load engaging surface. The beam of IR light is reflected off the surface and is at least partially absorbed by the detector component. Within the sensor, the internal circuitry measures the angle between the sensor and the absorbed IR light and, via trigonometric operations, uses the angle to further calculate the distance between the sensor and the interfering surface and expresses the distance as an analog voltage. The sensor communicates the calculated distance information to the controller 40 via the analog output.

Referring further to FIG. 13, in one illustrated exemplary embodiment, the sensors 350 may be arranged in grid arrays of rows and columns. When the space between the clamp arms 321, 323 is unoccupied, the stimulus output by all sensors will be commensurate with the distance between the clamp arms. The signal from at least one of the load geometry sensors 50, however, will change when a load of items 313 is interposed between the clamp arms 321, 323. The controller 318 or 320 may then calculate the load's approximate volume. The number of rows and columns of load geometry sensors whose signal indicates the presence of the load respectively correspond to the load's height and depth, and the magnitude of the change in the signal from the obstructed sensors, relative to the signal generated while the sensors are unobstructed, correspond to the load's width. Alternatively the sensors 350 may be arranged in any other suitable type of array.

At least one of the load geometry sensors 350 may also function as a load proximity sensor. As is described hereafter, during a clamping operation the present system advantageously adjusts the maximum hydraulic clamping pressure as a function of the distance between the clamp arms and the load, such that a desired clamping pressure is reached at a desired distance.

Other embodiments of the present system (not shown) such as an embodiment intended for use with a hydraulically operated pivoted-arm clamp for clamping cylindrical objects, may utilize different sensor arrangements for measuring the load geometry. For example, the diameter and height of a cylindrical load could be determined in the same manner described above. By way of non-limiting example, the diameter of a cylindrical load (not shown) could alternatively be determined by measuring the stroke of a hydraulic cylinder (not shown) as the clamp arm contacts the load, but prior to clamping the load, using a string potentiometer (not shown) or an etched rod and optical encoder (not shown) in combination with other sensors.

In the exemplary embodiment of the present system, the controller 318 or 320 has access to memory (not shown) containing information corresponding to the preferred operation of the clamp when gripping and lifting various load types and geometric configurations thereof, preferably arranged in look-up tables organized by load category and load geometry. The information may be a characteristic, preferably one closely correlated with an optimal maximum clamping force, or optimal maximum hydraulic clamping pressure, such as load weight, load fragility, load packaging, etc. For each load category, the data is preferably further categorized according to the potential geometric configurations of the detected load category.

In some embodiments, the data may be statically stored at a location remote from the host vehicle 112 and/or the attachment 310, such as in a facility's central management system or an offsite database, and made accessible to the controller 318 or 320 over an internal and/or external network or networks. Upon determining the relevant load characteristics, e.g. the load category and geometric configuration, the controller may copy the necessary data from the external source into memory.

The data in memory may be specific to the types of loads and load geometries the clamp may encounter at the facility in which it operates. The data may be updated via the data receiver as necessary; for example when new categories of loads are introduced to the facility or when an aspect of the current data is deemed to be insufficient or inaccurate.

As described above, the present system may obtain a LOAD ID, or other identifying indicia, for the load 313 to be clamped by reading a coded label 334 on the load. Alternatively, such LOAD ID or other identifying information can be obtained by other types of data receivers directly from the facility's central management system or from other load handling clamps via a wireless network interface. As also described above, the present system uses the load geometry sensors to calculate an approximate volume of the load. Both items of information are advantageously determined before the clamp arms clamp the load and with no input required from the clamp operator. The controller 318 or 320 looks up the optimal maximum hydraulic clamping pressure for the determined LOAD ID and load geometric profile. This optimal maximum pressure is then applied to the load during the clamping operation.

Figure 15:
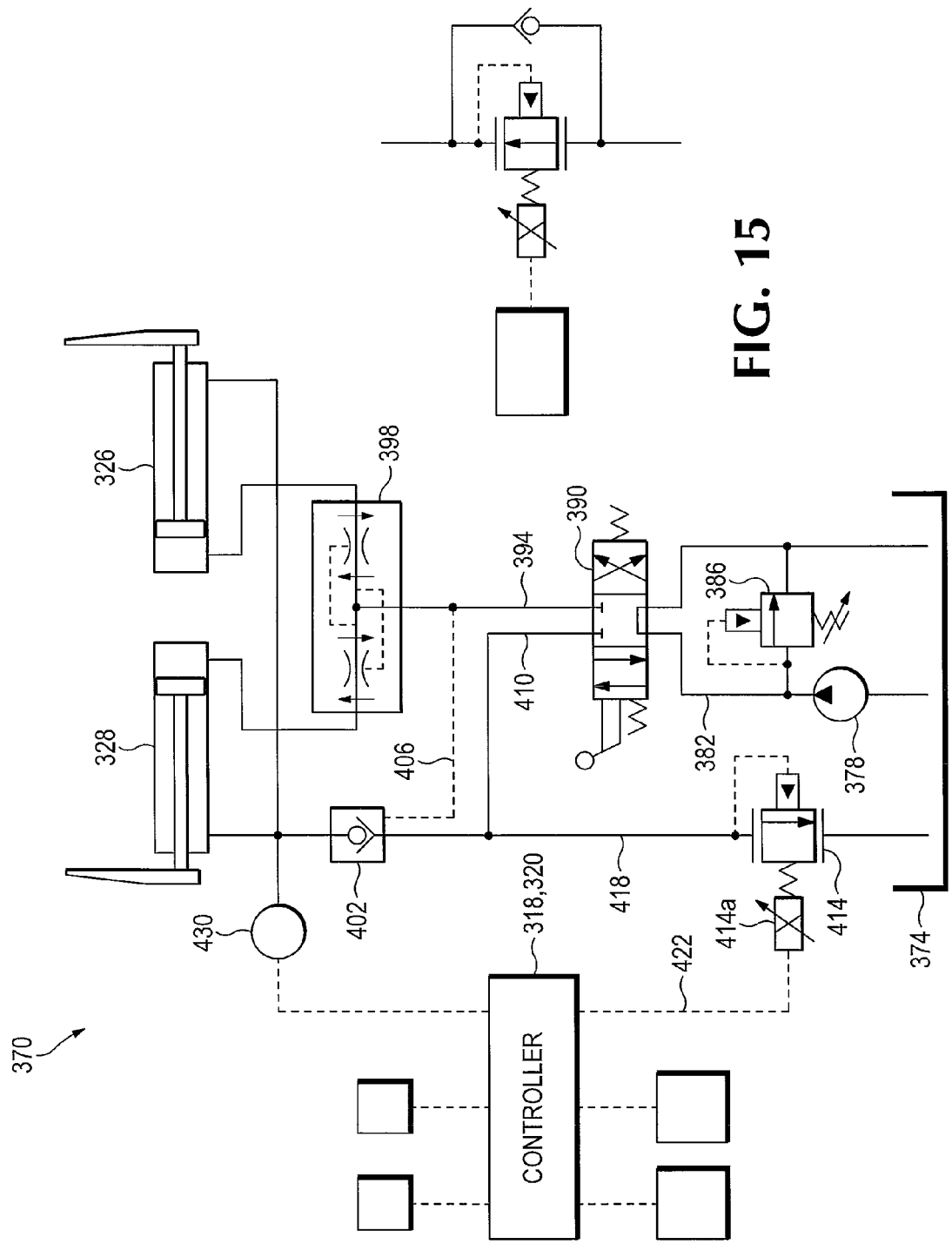
FIG. 15 shows a circuit diagram of the carton clamp attachment of FIG. 12.

Referring to FIG. 15, hydraulic clamping cylinders 326, 328 are controlled through hydraulic circuitry, indicated generally as 370 in simplified schematic form. The hydraulic clamping cylinders 326, 328 receive pressurized hydraulic fluid from the lift truck's reservoir 374 through a pump 378 and supply conduit 382. Safety relief valve 386 opens to shunt fluid back to the reservoir 374 if excessive pressure develops in the system. The flow in conduit 382 supplies manually actuated clamp control valve 390, as well as manually operated valves such as those controlling lift, tilt, side-shift, etc. (not shown), which may be arranged in series with valve 390. The clamp control valve 390 is controlled selectively by the operator to cause the cylinders 326, 328 either to open the clamp arms or to close the clamp arms into initial contact with the items 313 in the load.

To open the clamp arms 315, 317, the schematically illustrated spool of the valve 390 is moved to the left in FIG. 15 so that pressurized fluid from line 382 is conducted through line 394 and flow divider/combiner 398 to the piston ends of cylinders 326, 328, thereby extending the cylinders 326 and 328 at a substantially equal rate due to the equal flow-delivering operation of the divider/combiner 398, and moving the clamp arms 315, 317 away from each other. Pilot-operated check valve 402 is opened by the clamp-opening pressure in line 394 communicated through pilot lines 406, enabling fluid to be exhausted from the rod ends of cylinders 326, 328 through line 410 and valve 390 to the reservoir 374 as the cylinders 326, 328 extend.

Alternatively, to close the clamp arms and clamp the items 313 of the load, the spool of the valve 390 is moved to the right in FIG. 15 so that pressurized fluid from line 382 is conducted through line 410 to the rod ends of cylinders 326, 328, thereby retracting the cylinders 326, 328 and moving the clamp arms 313, 317 toward each other. Fluid is exhausted at substantially equal rates from the piston ends of the cylinders 326, 328 to the reservoir 374 through the flow-divider/combiner 398, and then through line 394 via the valve 390. During closure of the clamp arms 313, 317 by retraction of the cylinders 326, 328, the maximum hydraulic closing pressure in the line 410 is preferably controlled by one or more pressure regulation valves. For example, such a pressure regulating valve can be a proportional relief valve 414 in line 418 in parallel with line 410, such maximum hydraulic closing pressure corresponding to different settings automatically selectable in a substantially infinitely variable manner by controller 318 or 320 via control line 422, which electronically adjusts the relief pressure setting of valve 414 by variably controlling a solenoid 414a of the valve. Alternatively, a proportional pressure reducing valve could be interposed in series in line 410 to regulate the maximum hydraulic closing pressure in line 410. As further alternatives, selectable multiple non-proportional pressure relief or pressure reducing valves can be used for this purpose. If desired, the controller 318 or 320 could also receive feedback of the clamp force through hydraulic closing pressure from optional pressure sensor 430 to aid its control of the foregoing pressure regulation valves. Such feedback could alternatively be provided from a suitably mounted clamp force-measuring electrical transducer (not shown).

Referring again to FIG. 12, the RF and/or CAN bus communications channels between the WPC transmitter 118 and WPC receiver 120 may be used to advantageously control the operation of the carton clamp 310 using data received from the code reader 332 and the load geometry sensors 350 and pressure sensors 430, among other devices. In a first embodiment, for example, the controller 318 on the host vehicle 112 may receive load geometry data from the sensors 350 via the CAN bus communication channel 124c, 126c (shown in FIG. 5), and may also receive the data from the code reader 332 from the CAN bus communication channel. The controller 318 on the host vehicle may therefore use the information to determine an appropriate clamp pressure, as previously described. Use of the CAN channel to communicate sensor and load ID data advantageously allows use of the RF channels to simultaneously communicate other data back to the host vehicle, which may be useful, for example, to warn an operator when an operation is completed or the attachment is in the correct position by turning on an indicator or powering a solenoid for function control.

In an alternative embodiment, the attachment 310 (carton clamp) may include a controller 320 that receives data from the load geometry sensors 350 and the code reader 332 and uses that data to determine an appropriate clamping pressure, which is then communicated to the host vehicle 112 via one or more of the RF communication channels from the WPC receiver 120 to the WPC transmitter 118, or the CAN channel, as appropriate. For example, where the possible clamping pressures are limited to two alternate pressures, a single RF channel may be used to communicate the required pressure. Alternatively, two RF channels would permit communication of one of up to four possible pressures. If more possible pressures are available, depending on the application, either the CAN communication channel may be used, more RF channels may be integrated into the WPC units 110, or a multiplexing system such as that shown in FIG. 8 may be used. As noted earlier, using the CAN channel to communicate back to the host vehicle would allow other information to be simultaneously sent to the host vehicle via the R channels.

It should be understood that the carton clamp example just described was used for illustrative purposes only, as the possible application of the WPC units 110 extend to any attachment that sends data to a host vehicle used for proportional control of the attachment by using analog or other feedback more complex than binary switching controls through the RF I/O channels as previously described. It should also be understood that the data communicated from the attachment 310 to the host vehicle 112 may be used to automatically control the attachment 310 via an appropriate controller 318 or 320, or may alternatively be used to provide information to a user through a GUI or other display, audio device, etc., who then make the appropriate response through an interface such as a touch screen, keyboard, lever, or any other input device to issues new commands that are similarly sent back to the attachment through the WPC unit 110 and/or pressure lines 360, 362.

Those of ordinary skill in the art will also appreciate that the arrangement schematically illustrated in FIG. 12 is exemplary only, and can be modified as appropriate. For example, though FIG. 12 shows a flow and pressure valve array as being mounted on the carriage 301, the array may instead be mounted on the attachment. Similarly, though FIG. 12 shows the WPC receiver 120 being connected directly to the valves array on the carriage 301, other implementations may have the output connections from the WPC receiver 120 all connect to devices on the attachment 310 (e.g. the battery, controller) with other connections (not shown) from such devices to the valve array on the carriage 301.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An assembly comprising:
   (a) a transmitter unit and a receiver unit, the transmitter unit capable of transmitting wireless electrical power to the receiver unit;
   (b) the receiver unit having a first wired connector capable of selective and disengageable manual connection to a power consuming load device such that said power consuming device may receive said wireless electrical power when connected, and a second wired connector capable of selective and disengageable manual connection to a power storage device, where said first wired connector is capable of delivering electrical power to said power consuming device from said power storage device when said receiver unit does not receive said wireless electrical power from said transmitter unit.

2. The assembly of claim 1 where said transmitter unit is capable of wirelessly transmitting data to the receiver unit.

3. The assembly of claim 2 where said transmitter unit transmits at least one of RF data and network protocol data.

4. The assembly of claim 1 where said receiver unit is capable of wirelessly transmitting data to the transmitter unit.

5. The assembly of claim 4 where said transmitter unit transmits at least one of RF data and network protocol data.

6. An assembly comprising:
   (a) a transmitter unit and a receiver unit, the transmitter unit capable of transmitting wireless electrical power to the receiver unit;
   (b) the receiver unit having a first wired connector capable of selective and disengageable connection to a battery and a second wired connector capable of selective and disengageable connection to a power consuming load device; where
   (c) said first wired connector is capable of recharging the battery using a first portion of said wireless electrical power while said second wired connector simultaneously delivers a second portion of said wireless electrical power to said power consuming load device.

7. The assembly of claim 6 where said first wired output is capable of receiving electrical power from said battery.

8. The assembly of claim 7 where said electrical power received from said battery is capable of powering said power consumption device when said power consumption device is connected to said receiver unit.

9. The assembly of claim 8 including a power management control device in said receiver unit that manages the use of said wireless electrical power and electrical power from said battery.

10. The assembly of claim 6 including an inductive coil in said receiver unit.

11. The assembly of claim 10 where said inductive coil is electrically connected to a power management module that selects whether to send electrical power to said power consumption device from said inductive coil, from said battery, or from said inductive coil and said battery.

12. An assembly comprising:
  (a) a housing containing an inductive coil capable of receiving wireless electrical power; (b) an input connector for wired electrical power from a storage device external to the housing;
  (c) an output connector capable of delivering electrical power to a load external to the housing; and
  (d) circuitry implementing a power management system that selectively routes output power to said output connector, said output power comprising an automatically selected combination of said wired electrical power from said storage device and said wireless electrical power.

13. The assembly of claim 12 where said power management system is capable of selecting only said wireless electrical power to route to said output connector.

14. The assembly of claim 12 where said power management system is capable of selecting only said wired electrical power to route to said output connector.

15. The assembly of claim 12 where said wired electrical power is from a battery.

16. The assembly of claim 15 where said power management system may selectively recharge said battery using a first portion of said wireless electrical power while delivering a second portion of said wireless electrical power to said output terminal.

* * * * *

UNITED STATES PATENT AND TRADEMARK OFFICE
CERTIFICATE OF CORRECTION

PATENT NO. : 9,935,469 B2
APPLICATION NO. : 14/618784
DATED : April 3, 2018
INVENTOR(S) : McKernan et al.

Page 1 of 1

It is certified that error appears in the above-identified patent and that said Letters Patent is hereby corrected as shown below:

In the Specification

Column 5, Line 13: "be seen from in FIG. 3," should read – be seen from FIG. 3 –

Column 11, Line 13: "where each signals is" should read – where each signal is –

Column 11, Line 14: "a corresponding RF channels" should read – a corresponding RF channel –

Column 12, Lines 41-42: "and/or a battery operating devices" should read – and/or a battery operating device –

Column 12, Line 53: "permit a ride range" should read – permit a wide range –

Column 12, Line 62: "reference to FIG. 6 and the disclosed WPC unit 110" should read
– reference to FIG. 6 and its accompanying portion of the specification, the disclosed WPC unit 110 –

Column 15, Line 55: "canon clamp" should read – carton clamp –

Column 18, Line 48: "clamp arms 313, 317" should read – clamp arms 315, 317 –

Column 18, Line 52: "clamp arms 313, 317" should read – clamp arms 315, 317 –

Column 19, Line 48: "R channels." should read – RF channels. –

Column 19, Line 61: "who then make the appropriate" should read – who then makes the appropriate –

Signed and Sealed this
Ninth Day of July, 2019

Andrei Iancu
*Director of the United States Patent and Trademark Office*